US009872225B2

(12) United States Patent
Guba et al.

(10) Patent No.: US 9,872,225 B2
(45) Date of Patent: Jan. 16, 2018

(54) DRIVER IDENTIFICATION AND DATA COLLECTION SYSTEMS FOR USE WITH MOBILE COMMUNICATION DEVICES IN VEHICLES

(71) Applicants: Robert W. Guba, Baton Rouge, LA (US); Joseph E. Breaux, III, Baton Rouge, LA (US); Chad A. Kennedy, Baton Rouge, LA (US)

(72) Inventors: Robert W. Guba, Baton Rouge, LA (US); Joseph E. Breaux, III, Baton Rouge, LA (US); Chad A. Kennedy, Baton Rouge, LA (US)

(73) Assignee: obdEdge, LLC, Baton Rouge, LA (US)

( * ) Notice: Subject to any disclaimer, the term of this patent is extended or adjusted under 35 U.S.C. 154(b) by 0 days.

(21) Appl. No.: 15/212,266

(22) Filed: Jul. 17, 2016

(65) Prior Publication Data

US 2017/0078948 A1    Mar. 16, 2017

Related U.S. Application Data

(63) Continuation of application No. 14/944,178, filed on Nov. 17, 2015, now Pat. No. 9,398,421, which is a
(Continued)

(51) Int. Cl.
*H04W 48/04* (2009.01)
*H04W 4/02* (2009.01)
(Continued)

(52) U.S. Cl.
CPC .......... *H04W 48/04* (2013.01); *G06F 3/0227* (2013.01); *H04W 4/008* (2013.01); *H04W 4/027* (2013.01);
(Continued)

(58) Field of Classification Search
CPC ..... G06F 17/00; G01P 15/18; B60Y 2304/09; B60W 2520/125; B60W 2520/105
(Continued)

(56) References Cited

U.S. PATENT DOCUMENTS

2011/0112717 A1* 5/2011 Resner ................. G07C 5/008
701/31.4
2011/0205040 A1* 8/2011 Van Wiemeersch .... B60R 25/00
340/426.1
(Continued)

*Primary Examiner* — Cong Tran
(74) *Attorney, Agent, or Firm* — Todd Partners, P.C.; Jack D. Todd

(57) ABSTRACT

Systems, methods, and monitoring devices for collecting and transmitting operational data about a vehicle to a separate receiving device located within the vehicle, wherein the monitoring device includes a housing mounted to the vehicle and a power supply that powers electronic components contained within the housing, the electronic components include a microprocessor, memory in electronic communication with the microprocessor and configured to store the operational data, one or more sensors for detecting and determining the operational data about the vehicle, wherein the microprocessor causes the operational data to be stored in the memory, and a data transmission module, controlled by the microprocessor and configured to retrieve the operational data from the memory and to transmit the retrieved operational data to the separate receiving device. The operational data is stored in the separate receiving device for further processing, later upload, or further transmission to a remote receiver outside of the vehicle.

19 Claims, 6 Drawing Sheets

Related U.S. Application Data continuation of application No. 14/273,505, filed on May 8, 2014, now Pat. No. 9,338,605.

(60) Provisional application No. 61/936,152, filed on Feb. 5, 2014, provisional application No. 61/892,406, filed on Oct. 17, 2013, provisional application No. 61/821,019, filed on May 8, 2013.

(51) Int. Cl.
| | |
|---|---|
| *H04W 4/04* | (2009.01) |
| *G06F 3/02* | (2006.01) |
| *H04W 76/02* | (2009.01) |
| *H04W 4/00* | (2009.01) |
| *H04R 3/00* | (2006.01) |
| *H04W 84/12* | (2009.01) |
| *H04W 84/18* | (2009.01) |

(52) U.S. Cl.
CPC ............ *H04W 4/043* (2013.01); *H04W 4/046* (2013.01); *H04W 76/023* (2013.01); *H04R 3/00* (2013.01); *H04R 2499/13* (2013.01); *H04W 84/12* (2013.01); *H04W 84/18* (2013.01)

(58) Field of Classification Search
USPC ............ 455/418–420, 344, 345, 346, 575.1, 455/575.9, 95, 96; 701/31.1, 31.4, 31.5; 340/901, 902, 933
See application file for complete search history.

(56) References Cited

U.S. PATENT DOCUMENTS

| | | | |
|---|---|---|---|
| 2013/0131890 A1* | 5/2013 | Armitage | ................ G06F 17/00 701/1 |
| 2014/0052531 A1* | 2/2014 | Kent | ..................... G06Q 30/02 705/14.49 |

* cited by examiner

DRIVER IDENTIFICATION AND DATA COLLECTION SYSTEMS FOR USE WITH MOBILE COMMUNICATION DEVICES IN VEHICLES

CROSS REFERENCE TO RELATED APPLICATIONS

This patent application is a continuation of and claims priority benefit under 35 U.S.C. § 120 to U.S. patent application Ser. No. 14/944,178, entitled "Preventing Access to Functions on a Mobile Device in Response to an External OS-Level Command," filed Nov. 17, 2015, now U.S. Pat. No. 9,398,421, issued Jul. 19, 2016, which is a continuation of and claims priority benefit under 35 U.S.C. § 120 to U.S. patent application Ser. No. 14/273,505, entitled "Driver Identification and Data Collection Systems for Use with Mobile Communication Devices in Vehicles," filed May 8, 2014, now U.S. Pat. No. 9,338,605, issued May 10, 2016, which claimed priority benefit under 35 U.S.C. § 119(e) of: (i) U.S. Prov. Pat. Appl. No. 61/936,152, entitled "Managing Use of Mobile Communication Devices by Drivers in Vehicles," filed Feb. 5, 2014; (ii) U.S. Prov. Pat. Appl. No. 61/892,406, entitled "Improved Systems, Methods, and Devices for Controlling, Monitoring, and Managing Use of Mobile Communication Devices in Vehicles and Other Controlled Environments or Settings," filed Oct. 17, 2013; and (iii) U.S. Prov. Pat. Appl. No. 61/821,019, entitled "Systems, Methods, and Devices for Controlling, Monitoring, and Managing Use of Mobile Communication Devices in Vehicles and Other Controlled Environments or Settings," filed May 8, 2013.

FIELD OF THE PRESENT TECHNOLOGY

The systems, methods, and devices described herein relate generally to monitoring, managing, controlling, and making effective use of mobile communication devices within a vehicle and, more particularly, to accurately identifying vehicular drivers, collecting vehicular driving data, and interfacing with mobile communication device within the vehicle regarding the same.

BACKGROUND OF THE PRESENT TECHNOLOGY

Use of mobile computing and communication devices (i.e., "mobile devices") in vehicles is a hotly debated topic. While use of mobile devices provides convenience and can significantly enhance worker availability, connectivity, and productivity, it has also been shown that reckless use of mobile devices in moving vehicles has a detrimental effect and impact on the ability of a driver/operator (hereinafter referred to, for convenience, as the "driver") of the vehicle to focus on driving or otherwise operating the vehicle. In fact, some studies have indicated that distracted driving may be even more dangerous than driving while intoxicated or under the influence of drugs.

The number of vehicular accidents attributed to driver inattentiveness or distraction while talking, texting, surfing, browsing, or otherwise interacting with or using a mobile device within a vehicle, rather than focusing full attention on driving or operating the vehicle, continues to increase. Numerous cities, counties, states, and even the Federal government have imposed or are considering legal restrictions on use of (or that imposed increased sanctions, penalties, or punishments for accidents that occur due to use of) such mobile devices by a driver of a vehicle. As the functionality and capabilities of mobile devices continues to improve and expand, however, the potential distractions posed by mobile devices to drivers of vehicles is only likely to increase even more—leading to further accidents, higher risks to drivers, passengers, and any third parties near such vehicles, higher insurance rates, and more litigation.

Although laws may be passed, company policies may be adopted, and insurance policies may be tailored to provide lower insurance rates (deductibles and/or premiums) for drivers who do not use their mobile device while they are actively operating a vehicle, the options and ability for physically or technologically controlling, managing, limiting, monitoring, and auditing use of mobile devices, particularly in real time and based on other factors and variables (such as whether the vehicle is on and/or moving, how fast it is moving, what time of day it is, what day of the week it is, where the vehicle is located, and the like) has been limited, to date.

For these reasons, there remains a need in the industry for improved systems, methods, and devices that use computer-implemented, configurable policies to block, control, manage, limit, monitor, and/or audit use of mobile devices in vehicles and, particularly, use of such mobile devices by drivers of vehicles.

In addition to minimizing distracted driving, there remains a significant need to be able to identify, accurately and in a cost-effective and efficient manner, who is driving a vehicle at any given time, based on location of the driver's mobile device within the vehicle. Being able to detect one or more mobile devices in a vehicle provides some valuable data in this regard, especially if there is only one mobile device in the vehicle when it is being driven and especially if that mobile device is designated as the primary mobile associated with the primary driver of that vehicle. If there is more than one mobile device in a vehicle, being able to determine which mobile device is in, near, or closest to the driver quadrant or space within the vehicle provides even more valuable data.

For example, accurately identifying the driver versus the passenger in a vehicle helps to eliminate the inadvertent blocking or limiting of functionality of the passenger's mobile device, which is generally unnecessary to reduce distracted driving. In addition, accurately identifying the driver of a vehicle, based on their mobile device, enables important data to be collected about the vehicle, about the driver's driving patterns over time, and about the driver's activities and driving actions during a specific driving event. In addition, being able to store and upload relevant driver and vehicle data to a driver's mobile device presents significant business opportunities and can be used for many different purposes.

The above needs and features, as well as additional aspects and business applications, are disclosed herein and will become readily apparent to one of ordinary skill in the art after reading and studying the following summary of the present inventions, the detailed description of preferred embodiments, and the claims included hereinafter. The present inventions meet one or more of the above-referenced needs as described herein in greater detail.

SUMMARY OF THE PRESENT TECHNOLOGY

The present inventions described herein relate generally to systems, methods, and devices for monitoring, managing, controlling, and making effective use of mobile communication devices within a vehicle and, more particularly, to accurately identifying vehicular drivers, collecting vehicular status and driving data, and interfacing with one or more mobile communication devices within the vehicle regarding the same. Briefly described, aspects of the present invention include the following.

In a first aspect of the present invention, a system for determining the location of a mobile device within a vehicle, includes (a) a controller located within the vehicle and configured to transmit at least two audio signals, a first audio signal directed generally into a driver space within the vehicle and a second audio signal directed generally into a passenger space within the vehicle, and (b) software code stored in memory of the mobile device and having instructions executable by the processor that performs the steps of: (i) detecting the at least two audio signals, (ii) sampling the at least two audio signals for a predetermined period of time; (iii) performing digital signal processing on the sampled at least two audio signals; and (iv) based on the results of the digital signal processing, determining whether the mobile device was located within the driver space of the vehicle during the predetermined period of time.

In a feature, the controller is mounted within the vehicle in proximity to a central axis of the vehicle, the central axis extending generally between the driver space and the passenger space within the vehicle. In some embodiments, the controller is mounted on the inside surface of the front windshield of the vehicle. In other embodiments, the controller is built into the vehicle.

In another feature, the controller includes a built-in speaker system for transmitting the at least two audio signals. In some embodiments, the built-in speaker system includes a first speaker configured to transmit the first audio signal generally into the driver space within the vehicle and a second speaker configured to transmit the second audio signal generally into the passenger space within the vehicle.

In yet another feature, the controller is in electronic communication with an audio system of the vehicle that has at least two speakers. Preferably, the first audio signal is output through one of the speakers positioned near the driver space within the vehicle and the second audio signal is output through another speaker positioned near the passenger space within the vehicle.

Preferably, each of the at least two audio signals are transmitted at a frequency above 19 kHz, which is above the audible level that can be heard by most humans. In other embodiments, the at least two audio signals (or one or more tones that are included in the audio signals some or all of the time) can be transmitted at a frequency that is audible to humans.

In some embodiments, the at least two audio signals are transmitted simultaneously. In other embodiments, the at least two audio signals are transmitted repeatedly in sequence, with each transmission or broadcast lasting for a first predetermined duration. Preferably, there is a period of silence (or no broadcast of an audio signal) lasting a second predetermined duration between each audio signal transmission. The first and second predetermined durations can be the same or different periods of time.

In a feature, the first audio signal includes a first plurality of tones, each having its own frequency, which are all transmitted simultaneously. Preferably, the second audio signal also includes its own plurality of tones, each having its own frequency, which are all transmitted simultaneously. Preferably, the frequencies used for the tones of the first audio signal are different from the frequencies used for the tones of the second audio signal.

In yet a further feature, the instructions executable by the processor performs the additional steps of: filtering the sampled at least two audio signals and performing digital signal processing on the filtered at least two audio signals. In another feature, the instructions executable by the processor performs the additional steps of: calculating a baseline sound level from the sampled at least two audio signals, identifying each audio spike from the sampled at least two audio signals that exceeds the calculated baseline, applying Goetzel analysis on each identified audio spike, and initially determining whether the mobile device is in the driver space or the passenger space based on the application of the Goeztel analysis. In a further feature, the step of detecting the at least two audio signals is performed by a microphone of the mobile device within the vehicle. In another feature, the step of sampling the at least two audio signals is performed at a sampling rate that is at least twice the maximum frequency of the highest frequency of the first and second audio signals.

In another feature, a determination that the mobile device was located within the driver space of the vehicle during the predetermined period of time indicates the user of the mobile device was the driver of the vehicle during the predetermined period of time. In another feature, a determination that there is only one mobile device within the vehicle, regardless of whether the mobile device is in the driver or passenger space of the vehicle, indicates that the user of the mobile device was the driver of the vehicle during the predetermined period of time In another feature, even if a determination is made that the mobile device was not located within the driver space of the vehicle during the predetermined period of time, the instructions executable by the processor performs the additional steps of determining whether the mobile device was oriented in a potentially "circumventing" manner, such that the mobile device was still usable or viewable by the driver of the vehicle despite being in the passenger space of the vehicle.

In a further feature, distracted driving prevention software blocks, controls, manages, and/or limits use of the mobile device when the mobile device is located in the driver space. Alternatively, distracted driving prevention software blocks or limits use of the mobile device even when the mobile device is located in the passenger space if the mobile device is determined to be oriented in a potentially "circumventing" manner.

Preferably, such distracted driving prevention software uses default or customized rules-based policies to determine what functionality of the mobile device is affected, when such functionality of the mobile device is affected, and how such functionality of the mobile device is affected. In some embodiments, such distracted driving prevention software causes the mobile device to be powered off, causes a blocking screen to be displayed which prevents other applications or functions of the mobile device to be accessed, or causes the controller to send one or more HID or similar signals back to the mobile device, which prevents unauthorized applications or functions of the mobile device to be used by the driver of the vehicle while the vehicle is being operated.

In a further feature, data collection software on the mobile device captures and collects relevant data about the vehicle and about the driver of the vehicle whenever the vehicle is in operation. Such data is collected and, preferably, time-stamped so that relevant data about the vehicle and about the driver of the vehicle can be matched to use of the vehicle over time. In a feature, such data may be uploaded to a system server for further processing, display, or use.

In another feature, software installed on the mobile device or associated with the system server uses the time-stamped, relevant data about the vehicle and about the driver of the vehicle to reward driving behavior, to maintain driver logging electronic records, to provide or help implement usage based insurance (UBI) scoring or policies, to capture valuable telemetric data, to detect accidents in real-time, to reconstruct use and actions associated with the vehicle during an accident or commission of a crime, to improve insurance claim processing, and to prevent or minimize insurance fraud prevention.

In yet another feature, software installed on the mobile device or associated with the system server uses the time-stamped, relevant data about the vehicle and about the driver of the vehicle to communicate with the vehicle to make "smart pairing" technologies used by the vehicle more efficient and accurate.

In a second aspect of the present invention, a device for collecting and transmitting operational data about a vehicle to a mobile device located within the vehicle includes (a) a housing mounted to the vehicle, and (b) a power supply contained within the housing and adapted to provide power to electronic components contained within the housing. Preferably, the electronic components include: (i) a microprocessor, (ii) memory in electronic communication with the microprocessor and configured to store the operational data, (iii) an accelerometer for detecting movement of the vehicle, the detected movement being converted by the microprocessor into an acceleration value stored as one of the operational data in the memory, and (iv) a data transmission module, controlled by the microprocessor and configured to retrieve the operational data from the memory and to transmit the retrieved operational data to the mobile device.

In a feature, the housing is mounted within the vehicle in proximity to a central axis of the vehicle, the central axis extending generally between a driver space and a front passenger space within the vehicle. In one embodiment, the housing is mounted on the inside surface of the front windshield of the vehicle. In another embodiment, the housing is permanently built or installed into the vehicle by the vehicle manufacturer by an after-market vendor.

Preferably, the power supply includes a solar panel, which is the primary source of energy used by the power supply. Optionally, the power supply includes a battery as the primary or back-up energy used by the power supply. Preferably, such battery is rechargeable. In another option, the power supply can be connected to the battery of the vehicle. Such connection can be hard-wired to the vehicle battery or connectable through a lighter plug or socket. Such power can be provided to the device through a conventional power supply connector or through a USB port.

In another feature, the electronic components further include a GPS module for detecting geographic location and speed of the vehicle. Such geographic location data or values and such speed data or values are preferably stored as operational data in the memory of the device.

Preferably, the data transmission module transmits or broadcasts the operational data about the vehicle using classic Bluetooth protocol. In one embodiment, the data transmission module makes a Bluetooth pairing with the mobile device. In another embodiment, the data transmission module broadcasts the operational data about the vehicle without making a Bluetooth pairing with the mobile device. Preferably, the operational data about the vehicle is broadcast in at least one field of the device name (e.g., "Friendly Name") of the data transmission module. In another feature, the operational data about the vehicle is broadcast in a plurality of device names associated with the data transmission module, wherein each of the plurality of device names includes at least one field containing the operational data. In some embodiments, the device name of the data transmission module is received by at least one other mobile device within the vehicle.

In another preferred embodiment, the data transmission module transmits the operational data about the vehicle using Bluetooth low energy (BTLE) protocol. Alternatively, the data transmission module transmits the operational data about the vehicle using WiFi protocols.

In a third aspect of the present invention, a system for preventing access to a prohibited function on a mobile device when the mobile device is in a vehicle, the mobile device having an operating system (OS) installed thereon, comprises: a control device installed within the vehicle; a software application installed and running in memory resident on the mobile device; wherein, after the software application establishes a connection with the control device, if a prohibited function is active or attempting to become active on the mobile device, the software application causes the mobile device to transmit a notification signal to the control device; wherein, in response to receipt of the notification signal from the mobile device, the control device transmits an OS-level command back to the mobile device; and wherein, in response to receipt of the OS-level command from the control device, the operating system of the mobile device prevents access to the prohibited function without any direct interference or interruption of the prohibited function by the software application installed on the mobile device.

In a feature, the OS-level command is transmitted using a human interface device (HID) protocol. Preferably, the OS-level command is interpreted by the operating system of the mobile device as one or more key press signals from a remote keyboard. For example, the one or more key press signals represent pressing of one or more home keys, power keys, or a combination of home and power keys. In one embodiment, in response to receipt of the one or more key press signals, the operating system of the mobile device powers off the mobile device. In another embodiment, when the prohibited function is active or attempting to become active in a foreground window of the display of the mobile device, in response to receipt of the one or more key press signals, the operating system of the mobile device closes or minimizes the foreground window of the mobile device. In yet a further embodiment, in response to receipt of the one or more key press signals, the operating system of the mobile device causes the mobile device to go to a locked screen status.

In another feature, the software application is a distracted driving application configured to prevent a user of the mobile device from accessing prohibited functions on the mobile device when the user of the mobile device is driving the vehicle.

In yet another feature, the control device and the mobile device are separate and distinct devices.

Preferably, the software application establishes a connection with the control device when the mobile device is in a powered-on state and when the mobile device is in the vehicle in which the control device is installed.

In a feature, the notification signal transmitted by the software application identifies what type of OS-level command the control device should transmit back to the mobile device.

In another feature, the software application determines whether a function on the mobile device that is active or attempting to become active is prohibited. In some embodiments, the software application determines whether the function on the mobile device is prohibited based on a rules-based policy associated with the mobile device.

In another feature, the notification signal is transmitted from the mobile device to the control device using a wired connection, a WiFi wireless connection, or a Bluetooth wireless connection.

In yet a further feature, in response to receipt of the notification signal from the mobile device, the control device periodically re-transmits the OS-level command back to the mobile device for a predetermined period of time.

In a fourth aspect of the present invention, a system for preventing access to functions of a mobile device when the mobile device is in a vehicle comprises: a control device installed within the vehicle, the controlled device configured to determine when the vehicle is moving above a threshold speed; an operating system (OS) installed and operating on the mobile device, the operating system enabling the mobile device to receive OS-level commands transmitted by the control device using a human interface device (HID) protocol; wherein, after the control device determines that the vehicle is moving above the threshold speed, the control device periodically transmits an OS-level command to the mobile device using the HID protocol as long as the vehicle is moving above the threshold speed; and wherein, in response to receipt of the OS-level command from the control device, the operating system of the mobile device prevents access to the functions on the mobile device.

In a feature, the OS-level command is interpreted by the operating system of the mobile device as one or more key press signals from a remote keyboard. Preferably, the one or more key press signals represent pressing of one or more home keys, power keys, or a combination of home and power keys. In one embodiment, in response to receipt of the one or more key press signals, the operating system of the mobile device powers off the mobile device. In another embodiment, in response to receipt of the one or more key press signals, the operating system of the mobile device closes or minimizes a foreground window of the display of the mobile device. In a further embodiment, in response to receipt of the one or more key press signals, the operating system of the mobile device causes the mobile device to go to a locked screen status.

The present inventions also encompasses computer-readable medium having computer-executable instructions for performing methods of the present invention, and computer networks and other systems that implement the methods of the present invention.

The above features as well as additional features and aspects of the present invention are disclosed herein and will become apparent from the following description of preferred embodiments of the present invention.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In addition, further features and benefits of the present technology will be apparent from a detailed description of preferred embodiments thereof taken in conjunction with the following drawings, wherein similar elements are referred to with similar reference numbers, and wherein.

DETAILED DESCRIPTION OF PREFERRED EMBODIMENTS

Figure 1:
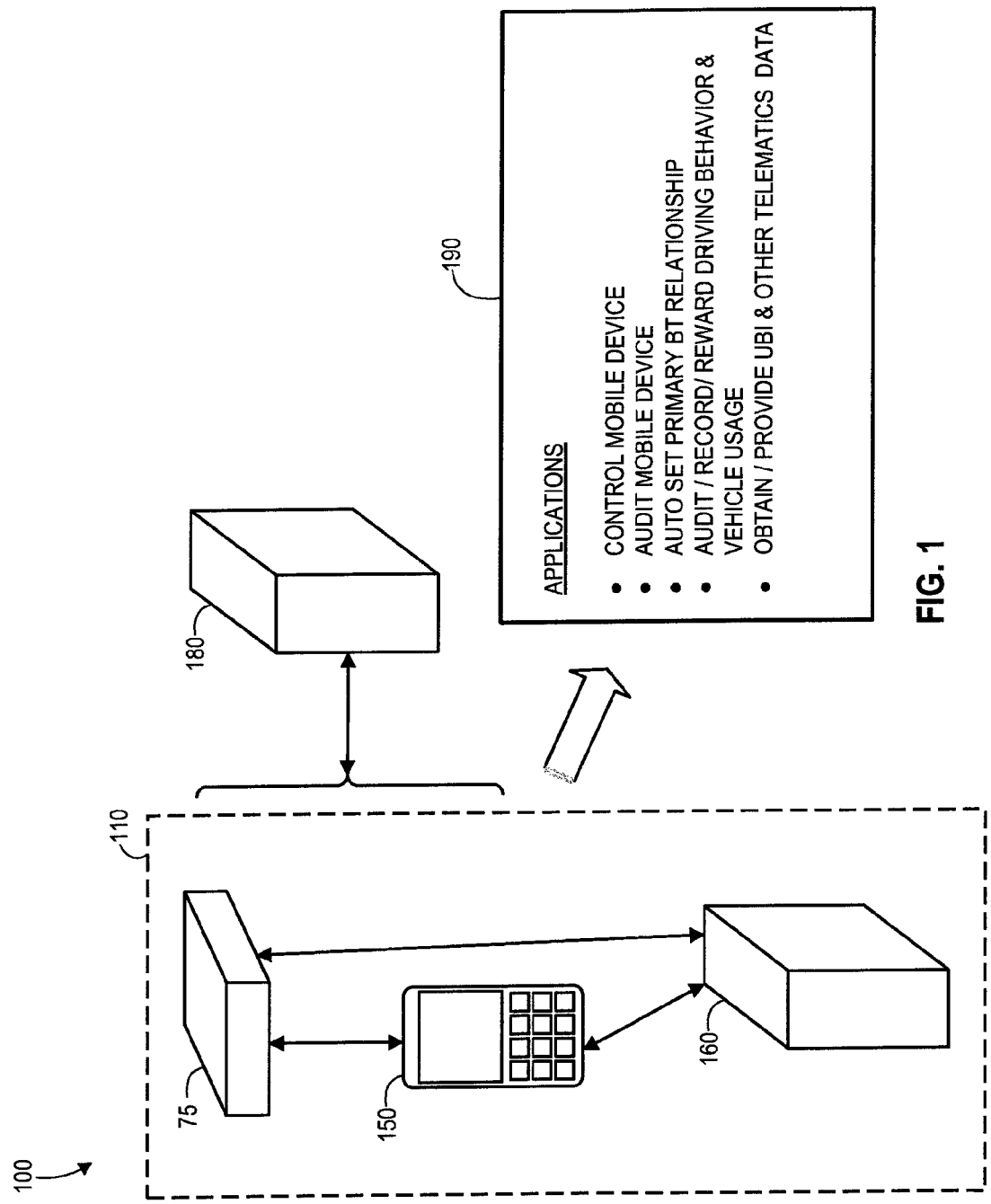
FIG. 1 is a high level system view of one embodiment of the present invention.

Before the present technologies, systems, products, articles of manufacture, apparatuses, and methods are disclosed and described in greater detail hereinafter, it is to be understood that the present technologies, systems, products, articles of manufacture, apparatuses, and methods are not limited to particular arrangements, specific components, or particular implementations. It is also to be understood that the terminology used herein is for the purpose of describing particular aspects and embodiments only and is not intended to be limiting.

As used in the specification and the appended claims, the singular forms "a," "an" and "the" include plural referents unless the context clearly dictates otherwise. Similarly, "optional" or "optionally" means that the subsequently described event or circumstance may or may not occur, and the description includes instances in which the event or circumstance occurs and instances where it does not.

Throughout the description and claims of this specification, the word "comprise" and variations of the word, such as "comprising" and "comprises," mean "including but not limited to," and is not intended to exclude, for example, other components, integers, elements, features, or steps. "Exemplary" means "an example of" and is not necessarily intended to convey an indication of preferred or ideal embodiments. "Such as" is not used in a restrictive sense, but for explanatory purposes only.

Disclosed herein are components that can be used to perform the herein described technologies, systems, products, articles of manufacture, apparatuses, and methods. These and other components are disclosed herein, and it is understood that when combinations, subsets, interactions, groups, etc. of these components are disclosed that while specific reference to each various individual and collective combinations and permutation of these may not be explicitly disclosed, each is specifically contemplated and described herein, for all technologies, systems, products, articles of manufacture, apparatuses, and methods. This applies to all aspects of this specification including, but not limited to, steps in disclosed methods. Thus, if there are a variety of additional steps that can be performed, it is understood that each of the additional steps can be performed with any specific embodiment or combination of embodiments of the disclosed technologies, systems, products, articles of manufacture, apparatuses, and methods.

As will be appreciated by one skilled in the art, embodiments of the present technologies, systems, products, articles of manufacture, apparatuses, and methods may be described below with reference to block diagrams and flowchart illustrations of methods, systems, processes, steps, and apparatuses. It will be understood that each block of the block diagrams and flow illustrations, respectively, support combinations of means for performing the specified functions and/or combinations of steps for performing the specified functions.

The exemplary systems, methods, and devices described herein relate generally to monitoring, managing, controlling, and making effective use of mobile communication devices within a vehicle and, more particularly, to accurately identifying vehicular drivers, collecting vehicular status and driving data, and interfacing with one or more mobile communication devices within the vehicle regarding the same.

The present application incorporates herein by reference in their entirety the following: (a) U.S. Pat. No. 8,527,013, entitled "Systems, Methods, and Devices for Policy-Based Control and Monitoring of Use of Mobile Devices by Vehicle Operators," issued Sep. 3, 2013; (b) PCT Int'l Pat. Appl. No. US2010/034151, filed May 8, 2010; and (c) each application from which the above two applications claim priority benefit, including U.S. Prov. Pat. Appl. No. 61/176,640, entitled "System for Policy-Based Mobile Communications in Vehicles," filed May 8, 2009; U.S. Prov. Pat. Appl. No. 61/247,334, entitled "Improved System for Policy-Based Mobile Communications in Vehicles," filed Sep. 30, 2009; and U.S. Prov. Pat. Appl. No. 61/301,902, entitled "Further Improved System for Policy-Based Mobile Communications in Vehicles," filed Feb. 5, 2010.

As used herein, the term "vehicle" is intended to include automobiles, trucks, motorcycles, buses, planes, helicopters, blimps, balloons, gliders, boats, ferries, trains, trams, heavy equipment or machinery, and any type of apparatus, equipment, or other machine that is driven, operated, or controlled by a user (i.e., "driver") and that is susceptible to accident or injury to self or others if the driver is careless or not devoting full attention to operation of the vehicle.

As used herein, the term "mobile device" is intended to include and encompass, but not be limited to, any type of hand-held, portable, mountable, wearable, or similar computing or communication device that is usable within a vehicle, such as but not limited to cell phones, mobile phones, smart phones, push-to-talk devices, personal digital assistants (PDAs), text or email dedicated devices, general computers, laptops, electronic maps or other GPS location devices, vehicle dashboard screens, electronic reading devices, multimedia equipment, data tablets, electronic eyewear, wearable sensory or sensory-enhancement equipment, and any other computing or communication device that would or could be used by or accessible to the driver of a vehicle while it is moving or otherwise in operation and that could contribute to driver inattentiveness or otherwise interfere with the driver's ability to focus full attention on driving or operating the vehicle because of the talking, texting, surfing, browsing, viewing, or other interactive functionality of such device.

System Overview

As will be described hereinafter, the exemplary systems, methods, and devices include a main controller or control device that can be mounted, installed, or built into a vehicle. Preferably, such control device is designed to perform at least two primary functions. One primary function includes the ability to transmit or broadcast at least two different audio signals that can be detected by and then used by one or more mobile devices within the vehicle to enable such mobile devices to determine where they are located within the vehicle, such as in the driver quadrant or in a passenger (or non-driver) quadrant or space in the vehicle. In an alternative embodiment, the first primary function of the control device is to interface with the sound system of the vehicle itself to cause desired audio signals to be produced by the speakers of the sound system of the vehicle, which signals can then be detected and used by the one or more mobile devices to determine where the mobile devices are located within the vehicle.

A second primary function of the control device is the ability to transmit or broadcast vehicular status data. Such data transmissions are intended to be detected and received by one or more mobile devices within the vehicle and, in some embodiments, by the vehicle itself or by software applications being run on or by the vehicle. Preferably, the vehicular status data includes information that can be determined or detected by the control device itself, such as motion/acceleration/deceleration of the vehicle, speed of the vehicle, location of the vehicle, cabin temperature within the vehicle, sound or ambient noise within the cabin of the vehicle at any point in time. Preferably, such vehicular status data can be transmitted or broadcast by the control device to any receiving devices or applications within range using classic Bluetooth (BT) communication protocols and/or Bluetooth Low Energy (BTLE) communication protocols. Other data transmission protocols, such as WiFi, could also be used in alternative embodiments. Preferably, such vehicular status data is transmitted in real time on a periodic basis whenever the vehicle is being operated and whenever there is at least one receptive device or application located within the vehicle; however, in some embodiments or circumstances when there is not at least one receptive device or application located within the vehicle, such vehicular status data may be transmitted in bulk or in non-real time scenarios at a later time, when such receptive device or application does become available.

Additional or optional functions of the control device include storing vehicular status data in memory, communicating directly or indirectly with the on-board computer of the vehicle to obtain additional vehicle data generally available from the on-board computer, exchanging data or engaging in bi-directional communications with one or more mobile devices within the vehicle, exchanging data or engaging in bi-directional communications with the vehicle itself or with one or more applications being run by or within the vehicle, and exchanging data or engaging in bi-directional communications with at least one system server.

As will also be described hereinafter, the exemplary systems, methods, and devices include at least one application or software component embedded or downloaded onto one or more mobile devices used in a vehicle that are configured to handle and make use of the audio signals transmitted or broadcast by the control device. Such application or software component is preferably designed to process the at least two (or more) different audio signals that are transmitted by the control device directly or that the control device causes to be transmitted over the vehicle sound system. Using audio detection, sampling, filtering, digital signal processing, and other audio processing techniques and analysis, this first application enables each mobile device to determine the approximate location of such mobile device within the vehicle (i.e., whether or not such mobile device is located within the driver space or quadrant of the vehicle). In preferred embodiments, the first application is also able to determine when such mobile device is not within the driver space or quadrant of the vehicle but is positioned or oriented in a manner that it can still be used, viewed, or accessed by the driver in such a way that it could still be viewable by or accessible to the driver, which can be important, for example, in preventing the driver from trying to circumvent or avoid distracted driving blocking software that permits usage of mobile devices by passengers but not by drivers of vehicles.

The exemplary systems, methods, and devices also include at least a second application or software component embedded or downloaded onto one or more mobile devices used in a vehicle that are configured to receive the vehicular status data transmitted or broadcast from the control device and then to respond accordingly—based primarily upon the specific purpose of this second application or software component. As will be appreciated by those of skill in the art, such application or software component may also be embedded or downloaded into a computer system associated with the vehicle itself, such as the on-board computer, a main console computer, a head-rest processor/controller, and the like.

For example, such applications include but are not limited to: (i) controlling or limiting use of the mobile device when the vehicle is being operated (e.g. to prevent or minimize distracted driving caused by use of the mobile device within the vehicle)—such applications are preferably managed by rules-based policies that may only prohibit use of mobile devices by drivers of the vehicle or that may prohibit use of all mobile devices in the vehicle—whether used by the driver or a passenger, (ii) auditing, monitoring, and detecting use of the mobile device when the mobile device is in the vehicle or when the vehicle is being operated—such applications are similar to the distracted driving prevention applications, but instead of preventing or restricting use of the mobile device, their primary purpose is merely to capture and record such use, determine and log who is driving the vehicle at any given time based on use of the mobile device in the driver quadrant, and the like, (iii) controlling or managing functions of the vehicle for the convenience of the driver of the vehicle, such as implementing driver seat settings, mirror settings, steering wheel settings, radio settings, customized settings associated with on-vehicle applications (maps, display screen, user controls, and the like), and other driver preferences, based on detection of one or more mobile devices in or near the driver quadrant or space in the vehicle and assuming that the person associated with the detected one or more mobile devices is the current driver of the vehicle, and (iv) auditing or collecting data regarding driving behavior and vehicle usage, which can then be used to reward driving behavior, to provide or help implement usage based insurance (UBI) scoring or policies, to capture valuable telemetric data, and to capture other relevant information associated with the driver and with the vehicle that may be useful for accident detection, accident reconstruction, insurance claim handling, and insurance fraud prevention. Additionally, in many situations, the second application or software component will also make use of the location information determined by the first application or software component to determine whether the one or more mobile devices are in the driver quadrant and, correspondingly, determining who the driver of the vehicle is at any given period of time.

For example, the second application or software component can be configured to block or limit specific functionality of the mobile device to reduce the risk of distracted driving, but only when the device is in the driver space or quadrant. Such policy-based software applications can be used to block, control, manage, and/or limit use of the functionality of such mobile devices. Advantageously, such policy-based software applications may be adapted to use data provided by or obtained from the control device, from the vehicle's on board computer or similar vehicle components or systems, alone or in conjunction with other available external data or information (such as GPS location data, time of day, day of week, type of activity or communication attempted on the mobile device, and the like) more effectively to block, control, manage, and/or limit use of the functionality of such mobile devices.

In another example, the second application or software component can be used advantageously to monitor, audit, and record use of one or more mobile devices in a vehicle, even if actual functionality of the mobile device is not blocked, controlled, limited, or prevented by the system or policy. In some embodiments, all functions on one mobile device (e.g., cell phone) of the driver may be blocked entirely, while specific functions of another mobile device (e.g., a "smart" watch or a Google-glass-type of wearable items), may be allowed to the driver, for example, such as a vibration notification on the "smart watch" when the vehicle exceeds the speed limit of the road on which the vehicle is travelling or displaying of a map on a Google-glass-type of wearable items.

In a further example, the second application or software component can be used to capture relevant data and information about the vehicle when a mobile device is in or in close proximity to the vehicle—even if use of the mobile device is not blocked, controlled, limited, or prevented by the system or policy. Such systems, methods, and devices disclosed herein are also configurable to detect, monitor, and report on vehicle usage patterns, including period of excessive speeding or idle time.

In another example, the first and second applications or software components can be used, in combination, to determine which one or more mobile devices are in the driver quadrant of the vehicle, which can then be used to determine who is likely driving the vehicle—based on the assumption that the owner of the one or more mobile devices in or near the driver quadrant of the vehicle (or the owner of the only mobile device(s) in the vehicle at that time) is most likely to be the current driver of the vehicle at that time, which could then be used for usage based insurance (UBI) scoring, rewards programs, electronic driver logging, confirmation of who is driving during an accident or commission of a crime, and the like.

Being able to determine which one or more mobile devices are in the driver space of a vehicle could also be used advantageously by another example of the second application or software component, which can be used to make "smart pairing" technologies more efficient and accurate. Such software can reside on the mobile devices or in applications being run by the vehicle itself. For example, it is becoming more and more common for vehicles to be configured to adapt automatically to the person who is driving. Many aspects of the driving experience (such as which phone is currently connected to hands free, which address book is shared, which music is being streamed, seat adjustments, mirror adjustment, steering wheel settings, which applications run and are available on the vehicle's console display, and the settings of such applications running on the vehicle's console display, etc.) could be configured within the vehicle if it could be accurately determined who is driving the vehicle.

Currently, determining which mobile device is connected via Bluetooth to the driver's head unit or headrest is one rudimentary method used in making vehicle settings for the driver. Unfortunately, relying upon such Bluetooth connection is inexact and, at times, incorrect. For example, if two family members enter a vehicle today, only one of those mobile devices associated with the family members will actually connect to the head unit for music streaming, address book synching, hands free calling, and the like. Typically, the mobile device that has been previously designated as the "primary" device associated with the vehicle will prevail—even if such mobile device is not being carried by the current driver of the vehicle. There is, thus, an on-going need to be able to identify accurately who is driving the vehicle based on which one or more mobile devices are being carried by or are positioned near the current driver of the vehicle.

Using such technology, the driver's head unit or headrest can be configured to drop the connection to the "primary" mobile device associated with the vehicle when it has been determined that the primary mobile device is not located within the driver's space, but another one or more mobiles devices are. This would free up the connection for the mobile device(s) (and the customized vehicle settings) of the user who is actually sitting in the driver's seat—based on the actual mobile device(s) detected within the driver space. Head unit technology can take advantage of this smart pairing association without blindly relying upon which mobile device has been identified by the owner of the vehicle as the "primary" device associated with the vehicle. Thus, there is a need to be able to designate dynamically a specific mobile device that is in the driver space as the currently "active" or "primary" device and associate the vehicle settings to the user associated with that detected, specific mobile device.

Additional features, as described herein or as will be readily apparent to one of ordinary skill in the art, expand upon the capabilities of the core systems, methods, and devices described herein and are intended to improve the safe operation, manageability, portability, enforcement, and support of use of mobile devices by drivers of vehicles. Additional aspects and business applications, are disclosed herein and will also become readily apparent to one of ordinary skill in the art after reading and studying the summary of the present inventions, this detailed description of preferred embodiments, and the claims included hereinafter.

Turning now to FIG. 1, a high level overview of one exemplary system 100 of the present invention is illustrated. Preferably, the system 100 includes a main controller or control device 75 installed or mounted in a vehicle 110 (such vehicle being shown merely in the abstract using hashed lines). The control device 75 is intended to interact, as will be described in greater detail hereinafter, with at least one mobile device 150 located within the vehicle 110. As will also be described in greater detail hereinafter, the control device 75 and/or the at least one mobile device 150 are configured to communicate uni-directionally or bi-directionally with at least one system server 180 that is typically accessed over the cloud or through a cellular network communication. As will also be appreciated, the control device 75 and/or the one or more mobile devices 150 are configured to communicate uni-directionally or bi-directionally with a computer system 160 installed within the vehicle itself. Such computer system 160 associated with the vehicle itself would include, for example, the vehicle's on-board computer, a main console computer, a head-rest processor/controller, and the like.

In practice, the exemplary system 100 is useful for a wide variety of applications 190, such as (i) detecting where one or more mobile devices are located within the vehicle (e.g. determining whether the mobile device is in the driver's quadrant or space of the vehicle), (ii) controlling or limiting use of the one or more mobile devices when the vehicle is being operated (e.g. to prevent or minimize distracted driving caused by use of the mobile device within the vehicle), (iii) auditing, monitoring, and detecting use of the mobile device when the mobile device is in the vehicle or when the vehicle is being operated, (iv) controlling or managing functions of the vehicle, such as driver seat settings and driver preferences, based on detection of the mobile device in or near the driver's quadrant or space in the vehicle, and (v) auditing or collecting data regarding driving behavior and vehicle usage, which can then be used to reward driving behavior, to provide or help implement usage based insurance (UBI) scoring or policies, and to capture valuable telemetric data.

More specifically, the control device 75 is designed to perform at least two primary functions. First, in the preferred embodiment, the control device 75 is configured to transmit at least two different audio signals that can be detected and then used by one or more mobile devices to determine where such mobile devices are located within the vehicle. In an alternative embodiment, the control device 75 is configured to interface with the sound system of the vehicle itself to cause desired audio signals to be produced by one or more speakers of the sound system of the vehicle, which audio signals can then be detected and used by the one or more mobile devices to determine where such mobile devices are located within the vehicle. Second, the control device 75 is configured to transmit or broadcast vehicular status data. Such transmissions or broadcasts can be received and processed by mobile devices within the vehicle or by software system or applications being run by the vehicle itself. Preferably, the vehicular status data includes information that can be determined or detected by the control device itself, such as motion of the vehicle, speed of the vehicle, location of the vehicle, cabin temperature within the vehicle, sound or ambient noise within the cabin of the vehicle at any point in time.

Preferably, such vehicular status data can be transmitted or broadcast by the control device 75 using classic Bluetooth (BT) communication protocols or using Bluetooth Low Energy (BTLE) communication protocols. Specific details about such communication protocols are described in greater detail hereinafter. Preferably, such vehicular status data is transmitted in real time on a periodic basis; however, in some embodiments or circumstances, such vehicular status data may be transmitted in bulk or in non-real time scenarios.

Additional or optional functions of the control device 75 include storing vehicular status data in memory, communicating directly or indirectly with the on-board computer of the vehicle to obtain additional vehicle data, exchanging data or engaging in bi-directional communication with one or more mobile devices 150, and exchanging data or engaging in bi-directional communication with the at least one system server 180.

Preferably, the mobile device 150 makes use of two embedded or downloaded applications or software components, each designed to handle and make use of the data or communications made by the control device 75. First, one application or software component is preferably designed to process the two or more different audio signals that are transmitted by the control device 75 directly or that the control device causes to be transmitted over the vehicle sound system. Using audio detection, filtering, and digital processing techniques, this first application is able to determine the approximate location of each such mobile device within the vehicle (i.e., whether or not such mobile device is located within the driver space or quadrant of the vehicle). In preferred embodiments, the first application is also able to determine when the mobile device is not within the driver space or quadrant of the vehicle, but is positioned or oriented in a manner that it can still be used, viewed, or accessed by the driver in such a way that it could still distract the driver while driving. The second application or software component, whether being run on a mobile device or by the vehicle itself, is preferably designed to receive the vehicular status data from the control device 75 and then respond accordingly—based primarily upon the specific one or more applications 190 for which the system is intended to be used. Additionally, in many situations, the second application or software component will also make use of the mobile device location information (and driver identification) determined by the first application or software component. For example, the second application or software component can be configured to block or limit specific functionality of the mobile device to reduce the risk of distracted driving, but only when the device is in the driver space or quadrant.

Exemplary Control Device

Figure 2:
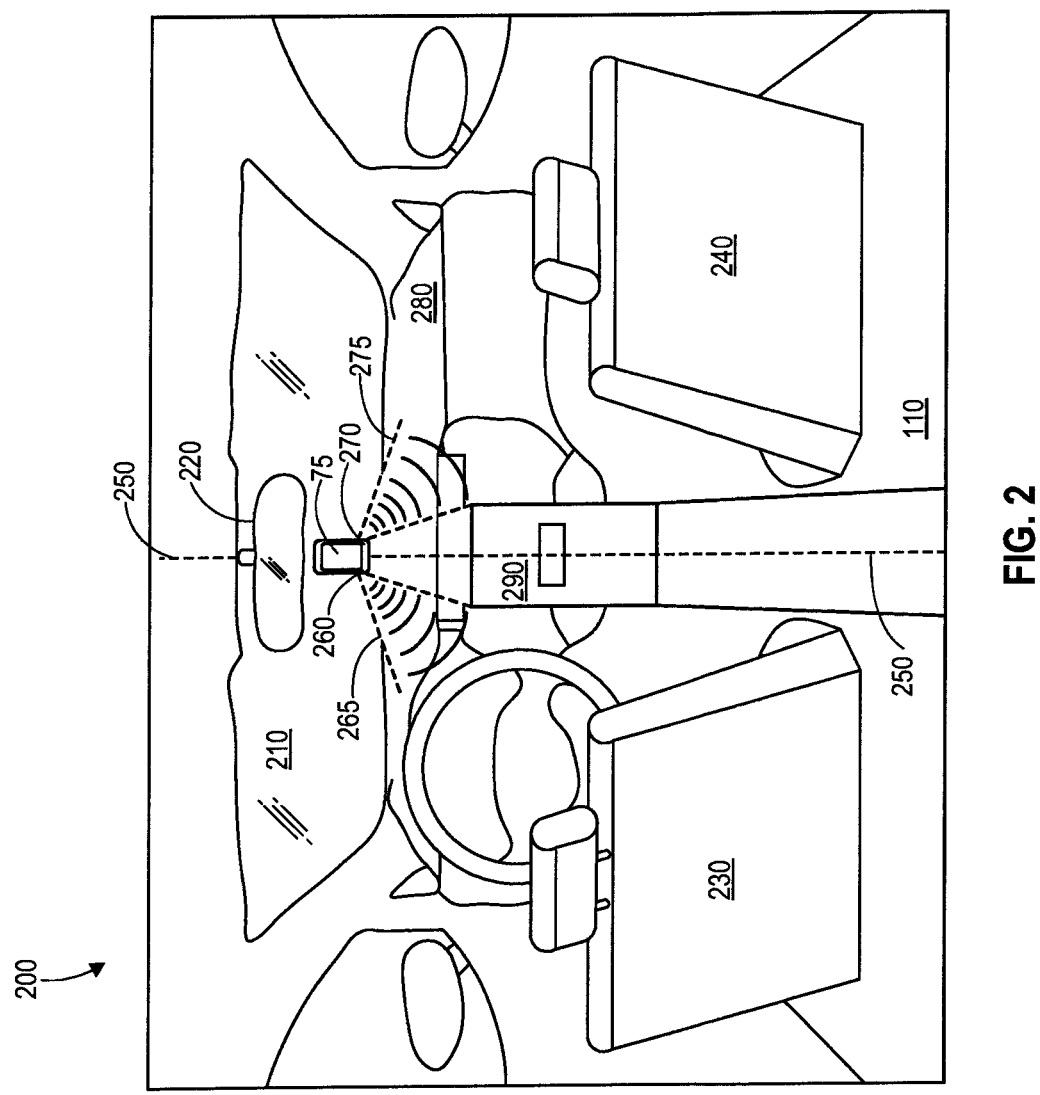
FIG. 2 is a perspective view illustrating a control device installed within a vehicle used with the embodiment of FIG. 1.

FIG. 2 illustrates a perspective view 200, from within a vehicle 110, in which an exemplary control device 75 is mounted conveniently on the interior surface of the windshield 210 of the vehicle 110, near the central rear view mirror 220 of the vehicle 110. This mounting location on the interior windshield 210, near the central rear view mirror 220, is convenient since it does not obstruct the visibility of the driver of the vehicle sitting in the driver's seat 230, since it can be installed in an after-market environment, and since it is strategically located along or near the central axis 250 of the vehicle 110 along an invisible dividing line between the driver's seat 230 and the front passenger's seat 240. Preferably, the control device 75 includes a first speaker 260 that is configured to transmit a first audio signal 265 aimed generally toward the driver space or quadrant of the vehicle. Preferably, the control device 75 includes a second speaker 270 that is configured to transmit a second audio signal 275 aimed generally toward the passenger space or quadrant of the vehicle.

Although the mounting location for the control device 75 shown in FIG. 2 is preferred, it will be appreciated by those of skill in the art that the control device 75 can be placed, mounted, or installed in different locations within the vehicle compartment. For example, the control device 75 can be placed anywhere along the central axis 250, such as lower on the windshield 210, on the dashboard 280, on the center console area 290, along the ceiling console area (not shown), or even on the back windshield (not shown), or the rear dashboard surface (also not shown). The exact location is not critical as long as one audio signal is aimed toward the driver space and the other audio signal is aimed toward the passenger space. As will be understood by those of skill in the art, the first application or software component installed on or used by the mobile device can be configured to work with control devices 75 positioned in front of or behind the driver's seat 230, as long as the configuration specifies which speaker 260, 270 and correspondingly which audio signal 265, 275 is aimed toward the driver space and which is aimed toward the passenger space. Likewise, the first application or software component can also be configured to work with the control device 75 that are used in countries or in vehicles in which the driver's seat and passenger's seat are on opposite sides of the vehicle (as compared to that shown in FIG. 2). Further, it will also be appreciated by those of skill in the art that the control device 75 does not have to be placed directly on the central axis 250 as long as the configuration of the first application or software component specifies which speaker 260, 270 and correspondingly which audio signal 265, 275 is aimed toward the driver space and which is aimed toward the passenger space.

In some embodiment, the control device 75 can make use of its on-board accelerometer to determine its orientation relative to gravity. Thus, the control device 75 can determine whether it has been installed correctly or whether it has been installed upside down, in which case the standard speaker configuration (one pointing toward the driver space and one pointing toward the passenger) would be reversed.

Figure 3:
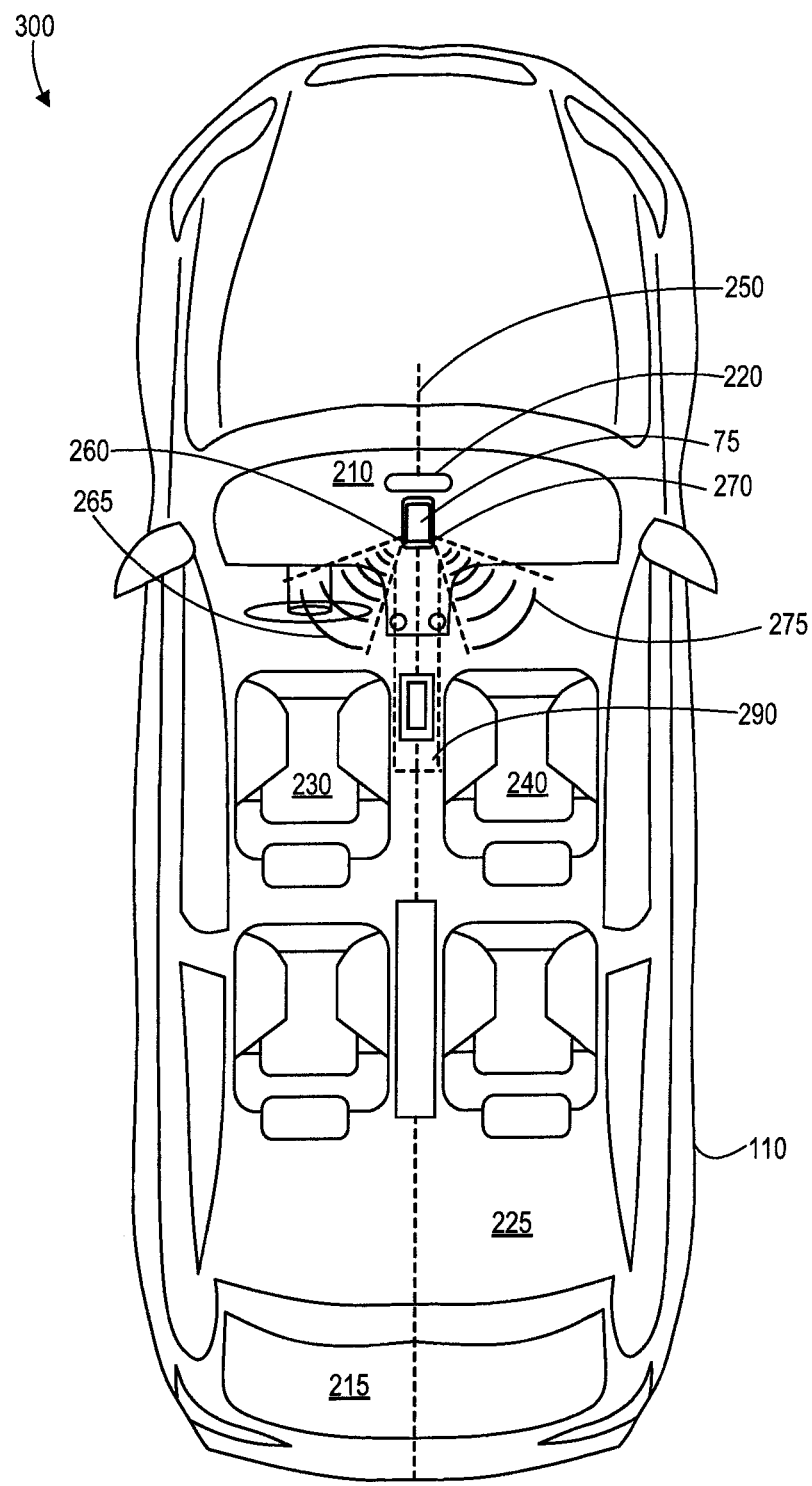
FIG. 3 is a top view illustrating the control device installed within the vehicle of FIG. 2.

FIG. 3 is similar to FIG. 2, but illustrates a top view 300 of a conventional vehicle 110 in which the exemplary control device 75 is mounted conveniently on the interior surface of the windshield 210 of the vehicle 110, near the central rear view mirror 220 of the vehicle 110. This mounting location on the interior windshield 210, near the central rear view mirror 220, is convenient since it does not obstruct the visibility of the driver of the vehicle sitting in the driver's seat 230, since it can be installed in an after-market environment, and since it is strategically located along or near the central axis 250 of the vehicle 110 along an invisible dividing line between the driver's seat 230 and the front passenger's seat 240. Preferably, the control device 75 includes a first speaker 260 that is configured to transmit a first audio signal 265 aimed generally toward the driver's space or quadrant of the vehicle. Preferably, the control device 75 includes a second speaker 270 that is configured to transmit a second audio signal 275 aimed generally toward the passenger's space or quadrant of the vehicle.

As with the exemplary system of FIG. 2, although the mounting location for the control device 75 shown in FIG. 3 is preferred, it will be appreciated by those of skill in the art that the control device 75 can be placed in different locations within the vehicle cabin. For example, the control device 75 can be placed anywhere along or near the central axis 250, such as lower on the windshield 210, on the dashboard, on the center console area 290, along the ceiling console area (not shown), or even on the back windshield 215, or the rear dashboard surface 225. The exact location is not critical as long as one audio signal is aimed toward the driver space and the other audio signal is aimed toward the passenger space.

Figure 4:
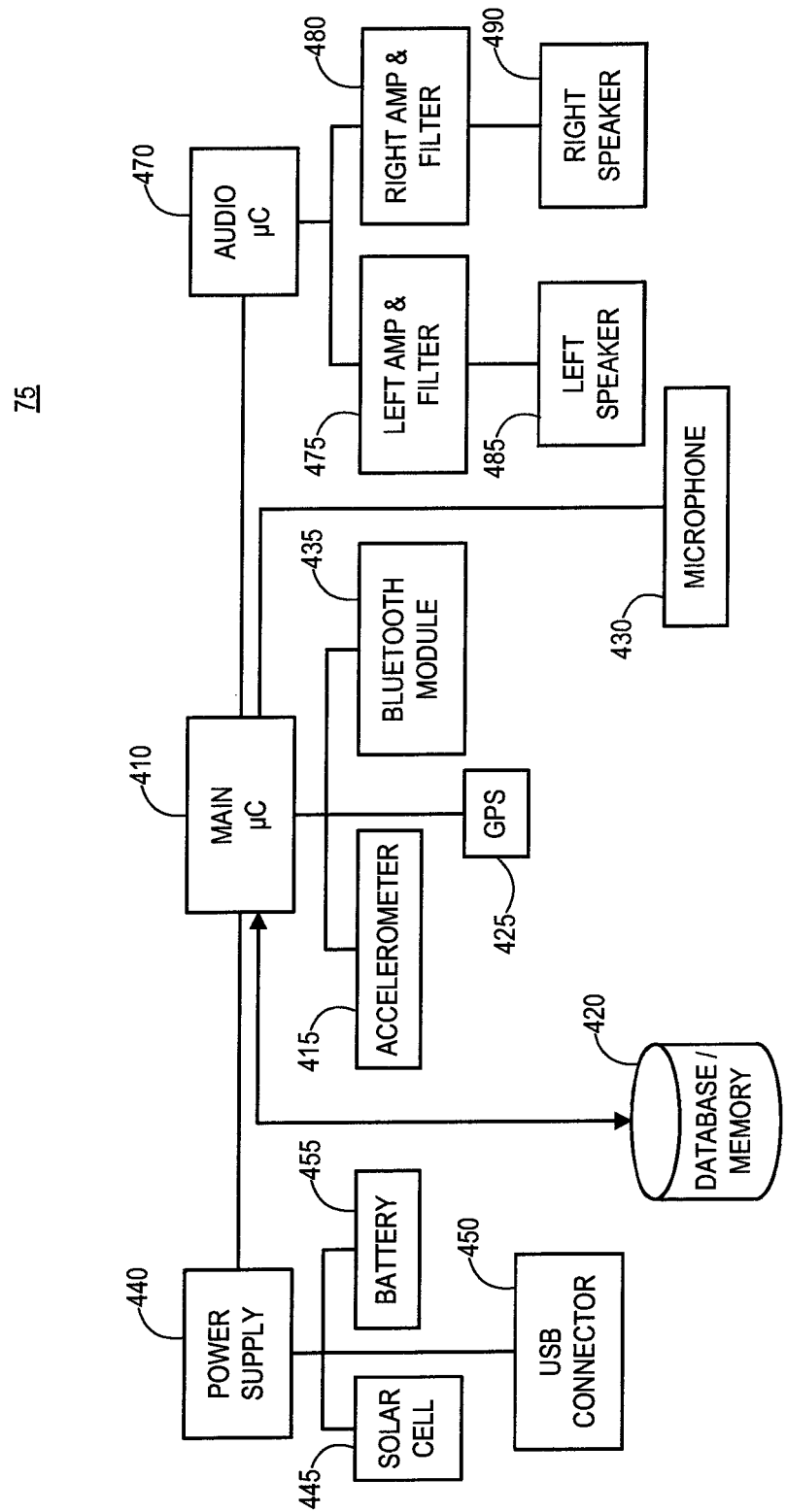
FIG. 4 is a schematic of primary components used in the control device illustrated in FIGS. 1-3.

FIG. 4 is a schematic that illustrates, at a high level, the primary components of the control device 75 used in the exemplary embodiments of the system described in association with FIGS. 1-3. The control device 75 preferably includes a main microprocessor 410, a power supply 440, and an audio processor 470. The main processor 410 receives power from the power supply 440 and controls the audio processor 470. Preferably, the control device 75 also includes an accelerometer 415, a GPS component 425, a Bluetooth (BT) module 435, and memory 420. The power supply 440 preferably includes a primary solar power component 445 and a rechargeable battery 455. Optionally, the power supply 440 also includes a USB power supply input to enable the control device 75 to connect to the power supply of the vehicle 110 in conventional manner. The audio microprocessor 470 preferably controls a left amplifier and filter 475 and left speaker 485 and a right amplifier and filter 480 and right speaker 490. In some embodiments, the control device 75 also includes a built-in microphone 430. As will be appreciated by those of skill in the art, the control device is able to detect ambient light levels based on the level of sunlight detected by the solar power component. Additionally, although not shown, the control device may also include a temperature sensor, which can detect and determine the ambient temperature level within the cabin of the vehicle, which may be of value in some end use applications.

Installing the control device 75 on the windshield of the vehicle allows solar power to be used as the primary power supply, with battery used for back-up purposes or when there is insufficient sunlight. This has the advantage of not requiring any wires or plugs to be connected during initial installation. It also allows more freedom in placement of the control device 75 within the vehicle 110. Power can be conserved by detecting long periods of time without any movement, as measured by the accelerometer 415 or other motion sensor, and then going into a low power (or "sleep") mode. Similarly, the control device 75 is preferably configured to power up (or "awaken") upon movement, again, as measured by the accelerometer 415 or other motion sensor. When the control device 75 is in regular power mode, the GPS 425 can be used for obtaining more accurate motion, speed, and position data. In some embodiments, it is still useful to have a USB power supply input on the control device 75 to be able to connect the control device 75 to the vehicle's power supply for occasions in which there is insufficient sunlight or in case the battery does not have sufficient charge to power the control device.

Having an independent and self contained control device 75 that can detect movement, at a minimum, and that has its own GPS tracking capability, which is not dependent upon data that must be obtained from the vehicle 110 or from the vehicle's on-board computer, offers many advantages. For example, the built-in accelerometer 415 can be used to determine when the vehicle, in which the control device is mounted, is moving. Because the control device 75 is physically connected to the vehicle, it would be assumed that any acceleration is likely caused by the vehicle in motion. Once the accelerometer 415 detects movement, the vehicle status (the fact that the vehicle is moving, the degree of acceleration, or the actual velocity—if GPS data is available) can be transmitted to any mobile devices within the vehicle using any of the data transmission protocols described herein, including Bluetooth, BTLE, WIFI, or audio. Similarly, rapid deceleration, sharp braking, or vehicle veering movements can also be detected by the accelerometer 415 and then transmitted. In preferred embodiments, the Bluetooth module 435 transmits the vehicle status data using classic Bluetooth and/or BTLE protocols.

From a practical standpoint, it is possible to use non-removable industrial, double-sided tape for mounting the control device to a windshield to prevent tampering, or to use tamper tape to detect tampering of the control device while still allowing eventual removal, when desired and authorized. As stated previously, the control device preferably is placed near or along the center axis of the vehicle. This control device preferably has one speaker pointing towards the driver quadrant and a second speaker pointing towards the passenger quadrant. Optionally, a third speaker can be placed pointing towards the back of the vehicle for better accuracy and filtering of back seat passengers. This control device could transmit or broadcast audio signals utilizing any one or combination of methods for mobile device location and corresponding driver identification, as will be described in greater detail hereinafter.

Advantageously, by being solar-powered, the control device 75 can be used for far more than distracted driving applications. For example, since the system can be used to identify drivers as compared to passengers, it is possible to automatically log drivers in and out of vehicles for electronic log books or hours of service type applications. The system can also be used for low cost UBI (usage based insurance) applications. Because the control device 75 can be installed by simply sticking, mounting, or otherwise attaching it to the vehicle windshield, consumers or fleet operators can easily install the device without needing any special equipment or expensive professional installs. This ease of installation and ability to "self power," provides a huge advantage in UBI, traditional telematics, insurance, and other driver or vehicle-usage applications.

The accelerometer 415 of the control device 75 is useful for detecting motion, braking, veering/swerving, and acceleration events associated with the vehicle. The GPS module 425 is useful for recording driving speed, collecting mileage information, and tracking vehicle location at any point in time during operation of the vehicle. The Bluetooth module 435 enables the system to communicate vehicular status data, as captured, obtained, or made available from the accelerometer and GPS module, to one or more mobile devices within the vehicle and/or to one or more applications being run by the vehicle. The Bluetooth module 435 could also be used to collect information from nearby sensor devices. For example, an OBDII device installed within the vehicle, as described in U.S. Pat. No. 8,527,013, can also have a Bluetooth module, which can communicate vehicle diagnostic and other detailed information obtainable from the vehicle's on-board computer, to the control device 75. A cellular component can also be added to the control device 75 to allow it to easily communicate data directly back to the at least one system server 180 using convention cellular communications. This allows the solar-powered control device 75 to have a function similar to a central hub within the vehicle for gathering information.

In one embodiment, rather than sending data directly from the control device 75 to a system server 180, such data can first be transmitted to one or more mobile devices within the vehicle, which can then upload such data to the system server 180. Finally, in some embodiments, vehicular status data may be provided separately to mobile devices within the vehicle both from the control device 75 as well as from any other data collection and communication devices within the vehicle (e.g. OBDII, JBUS, etc.). These arrangements provide a dynamic vehicle and data collection system that reduces cost while maintaining 24×7 connectivity.

Locating Mobile Devices in Vehicles Using Control Device

As stated previously, the control device 75 is designed to perform at least two primary functions. The first primary function is to transmit one or more signals that can be detected and then used by the mobile device to determine where the mobile device is located within the vehicle. There are a variety of ways to determine if a mobile device is in the driver quadrant (or side, for vehicles with no backseat) of a vehicle. One preferred method described herein is to use audio signals. Preferably, such audio signals are above 19 kHz, to prevent normal humans from being able to hear the tones, while still being in the range of typical audio output speakers and detectable by microphones on typical mobile devices. However, audible tones could also be utilized.

In a preferred embodiment, a first audio signal is played out of a speaker on the control device 75 and directed toward the driver space. A second audio signal is played out of a speaker on the control device 75 and directed toward the passenger space. Preferably, the first audio signal is a set of specific audio frequencies (1 or more) and the second audio signal is another set of specific audio frequencies (1 or more). Preferably, the frequencies used by the first and second audio signals are different from each other.

For example, in one implementation, the first audio signal includes three separate audio frequencies (e.g., 19100 hz, 19250 hz, and 19500 hz) played for a specific period of time, such as 50 ms. After 50 ms of playing, all sound playing stops for another predetermined period of time, such 200 ms. After 200 ms of silence, the second audio signal includes three different audio frequencies (e.g., 19200 hz, 19300 hz, and 19450 hz) played for another specific period of time, such as 50 ms. After 50 ms of playing, the system again pauses another predetermined period of time, such 200 ms, with silence before starting over by transmitting the first audio signal again. The frequencies, duration of playing or transmission, and duration of pause times are all exemplary and, as will be appreciated by one of skill in the art, could be configured using any number of combinations.

This method has several benefits in practice. For example, by spacing the playback out of each speaker, it is possible to reduce the potential for frequencies to interfere with one another. Also, the periods of silence allow any reverberations introduced within the vehicle cabin to dampen. Another benefit provided by this embodiment is the ability to detect relative distances. Because the play back timings are known or predetermined, it can be determined when to expect the frequencies to arrive at a mobile device based on its location within the vehicle. This deviation in the timings enables the system to identify accurately the quadrant of the vehicle within which the mobile device is located. The time from the beginning of the left audio to the beginning of the right audio, and vice-versa, is equal and fixed with a high degree of accuracy. Based on the speed of sound, the system can detect left-to-right versus right-to-left start times as being slightly different, depending on the position of the microphone of the mobile device relative to the speakers.

In another embodiment and as stated previously, the control device 75 can be integrated with the sound system of the vehicle. In such a configuration, the first and second audio signals can be played out of speakers built into the vehicle. In such embodiment, the first audio signal would be output through the speaker (or speakers) closest to the driver and the second audio signal would be output through the speaker (or speakers) closest to the passenger. Preferably, the control device 75 would control the audio outputs.

In yet a further embodiment, it is possible to broadcast first and second audio signals simultaneously. Such signals could either be broadcast from speakers on the control device 75 or by speakers of the vehicle under control of the control device 75. For example, the speaker aimed toward the driver or closest to the driver may broadcast a short duration tone at a first frequency, such as 19,100 Hz, while the speaker aimed toward the passenger or closest to the passenger may broadcast a short duration tone at a different frequency, such as 19,200 Hz. The length of the tones are predetermined. Preferably, the tones could be short, such as ten (10) milliseconds (ms), or longer, such as one (1) second.

As will be appreciated by those of skill in the art, any tone duration could realistically be used; the overall concept remains the same. Since, in this particular embodiment, the two tones are broadcast simultaneously, the frequency tone received first by a particular mobile device can aid in determining its location. For example, if the left tone reaches the mobile device first, this would indicate the mobile device is closer to the left side of the vehicle than right—which in certain countries would indicate that the mobile device is in the driver quadrant rather than the passenger quadrant. By utilizing more speakers and frequencies, exact quadrants could be determined. For instance, multiple control devices (one at the front of the vehicle and one at the back of the vehicle) could be used to provide four separate speakers, each having a dedicated audio frequency. Alternatively, each of the four speakers of the vehicle could be used in similar fashion. For example, the front left speaker (or speaker closest to the driver or aimed at the driver quadrant) could broadcast a tone at 19,100 Hz, the front right speaker at 19,200 Hz, back left speaker at 19,300 Hz, and back right speaker at 19,400 Hz. From these four different frequency audio signal, one could determine the location of the mobile device by comparing the order in which the frequencies are received by the mobile device(s). For example, if the first two frequencies received are from the front left speaker followed by the back left speaker, the mobile device is likely located in the driver seat.

The position is determined by comparing the relative start time of the different frequency tones, as observed by the microphone of each mobile device. Thus, each mobile device will observe the audio for each frequency to start frequently, up to multiple times per second. For this to work properly, the sample rate should be at least twice the maximum frequency emitted by any of the speakers, preferably higher. The exact start time of the frequency would preferably be determined using known digital signal processing (DSP) techniques.

One such technique is to perform a Fourier transform on a sub-window of the recorded audio. In this case, one would look for a spike at each of the frequencies emitted by the speakers. The time at which each frequency is marked as "started" would be the time at which the value of the Fourier transform for that frequency and window position exceeds a given threshold. That threshold may be fixed, or may be adaptive.

Additionally, the threshold may be different for different speakers. This is especially helpful to overcome the frequency response of the speakers and the microphone of the mobile device, especially at high frequencies.

Preferably, each speaker will emit its tone for a fixed period, followed by a fixed period of silence. This allows each mobile device to take multiple samples. This procedure can be used to help each mobile device determine the desired information in spite of a noisy environment or being near a middle point between two speakers. The processing of this information may be processor-intensive. Depending on the speed of the CPU of the mobile device(s) and its data connection, it may make sense to process the audio locally, or upload it to a server for processing. In the latter case, the audio may be sent raw, or may be preprocessed to reduce size.

In yet another embodiment, the mobile device and the control device can be programmed to perform a set of pings. Once the mobile device detects the control device in the vehicle for which it is allowed to communicate, the mobile device can be configured to emit a short duration high frequency tone. The control device in the vehicle would be configured to detect this high frequency tone and, in response, emit its own short duration tone. The mobile device would then compare the time from which it emitted its tone until the response tone from the control device was detected.

In one implementation, the mobile device would accomplish this by starting to record audio before producing its tone. It would then record for a set amount of time, long enough for the response tone to have come back. The mobile device would then use this audio capture to determine, using one or more DSP techniques, the difference in time between the start of its own tone and the start of the responding tone. Preferably, the mobile device's tone and the responding tone would be sufficiently different in frequency to be able to be clearly separated using DSP techniques. Using this information, the processing software on the mobile device would be capable of calculating the distance between mobile device and the system control device. Based on the distance, it would be possible to determine whether the mobile device is in the drivers quadrant, passenger quadrant, or in the back seat. For this method to operate properly, the responding tone generated by the control device would have to be reliably produced at a fixed time interval after the control device first detects the tone produced by the mobile device. Processing the audio capture can be performed locally on the phone, or remotely in the cloud. This method could further be enhanced by having multiple control devices located within the vehicle to help pinpoint the quadrant within which the mobile device is located with better accuracy.

In a slight variation of the above embodiment, it is not necessary to determine precise distances between the mobile device and the control device or to determine conclusively within which quadrant the mobile device is located. For example, just determining which mobile is closest to the control device may be enough information to determine what action to take, such as which mobile device should be blocked, scored, or logged. In this variation, the response time from emitting the tone from the mobile device until receiving the response tone from the control device would be shared with other mobile devices located within the vehicle. If the control device is placed nearest to the driver or driver's quadrant of the vehicle, then the mobile device with the shortest tone transmission and response time would be considered in the driver quadrant. Conversely, the mobile device with the longest tone transmission and response time would be considered in the driver quadrant depending on alternative placements (such as a location furthest away from the driver's quadrant) of the control device. The tone transmission and response times can be shared with the other mobile devices in the vehicle in many different ways. One way would be by uploading the information to the cloud and allowing an application running on a remote web server to determine the shortest (or longest) distance. Another way would be to share the information locally through standard Bluetooth, BTLE, or by changing a discoverable field on the mobile device, such as Friendly Name, to represent the information. For these methods to operate properly, the responding tone would have to be reliably produced at a fixed interval after the responding system control unit first detects one or more tones from mobile devices within the vehicle. Processing of the data could be performed locally on one or more mobile devices, or remotely in the cloud.

In yet a further embodiment, the amplitude of the various frequencies may be enough to determine mobile device location within the vehicle. One or more control devices could be installed or prebuilt into a vehicle, which simultaneously sends tones out of two or more speakers. All of the frequencies would be broadcast with the same relative power. The frequency, which is the loudest, would indicate the speaker that is closest to that respective mobile device. This would be accomplished on the mobile device by recording the audio and using one or more DSP techniques, such as Fourier transform, to determine amplitude. The average amplitude at the desired frequencies would be calculated across the recorded sample.

Again, the actual processing of the recorded audio could be performed locally or in the cloud. Utilizing this procedure, the frequencies could be broadcast in short duration bursts or played continuously into the cabin of the vehicle. The exact quadrant could again be determined by utilizing multiple speakers. However, this procedure could work using just two speakers or four speakers—in a manner as described above—with each speaker broadcasting at its predetermined and pre-set frequency. Each (or all) speakers could be continuously playing their tone or alternating each tone with periods of silence. The mobile devices within the vehicle can then compare the relative amplitude of each of the speakers to determine approximate location within the vehicle. It should be noted that the tone does not have to be played continuously, it can be played in short duration bursts, continuously, long bursts, or any combination thereof. It should also be noted that the use of signals out of each speaker in this embodiment could be any combination of frequency—both audible and in-audible tones could be used. To account for various frequency responses of the speakers and/or receiving mobile devices, the power at which each speaker is playing may be varied to account for the frequency response. The particular frequencies chosen will depend on several factors. For example, high noise and/or low fidelity environments will benefit from wider separation between the frequencies of the different speakers. In addition, wider separation of the frequencies can reduce the calculation load of the DSP performed, which may be beneficial for some handsets or mobile devices.

In another embodiment or as a variation of any of the above embodiments, one or more "presence" frequency tone may also be emitted from the speakers. These frequencies tone(s) would be emitted in equal power by all speakers. Preferably, such "presence" frequency tone(s) would be at a different frequency from any of the frequencies used for positioning determinations, as described above. These presence frequency tone(s) would enable the mobile device to determine that it is inside the vehicle or other designated/protected area. When the presence tone is used in the current system, the handset or other mobile device must first detect the presence frequency tone before it will interpret any other frequency tone for the purpose of determining its location within the vehicle. This may be especially useful in high noise and/or low fidelity environments. These "presence" signals could be utilized to improve the reliability of all of the above driver detection embodiments discussed above or, alternatively, such presence frequencies could be used as a standalone system.

For the various audio implementations discussed above, it is recommended that the frequencies used by the system not be harmonics of one another, as this could cause potential detection issues. Also, another aspect of operation is detecting the signal emitted from the speakers amid the ambient noise of the environment within the vehicle. Various procedures can be used to make this determination. For example, the powers at all measured frequencies, except the ones expected, can be averaged. This will represent the noise level. The power level at the expected frequencies can then also be measured. The expected frequencies must then exceed the noise by some threshold in order to be considered detected. The threshold for detecting the presence frequency may be the same or different from the threshold required for the positioning frequencies. Alternatively, the powers seen at all frequencies may be averaged over time to prevent false positives.

If the presence frequency is detected, but no positioning frequency is thereafter detected, then, after some predetermined period of time, the threshold for the positioning frequency may be lowered. In addition, if there is some external signal that the mobile device is inside the vehicle, such as a specific Bluetooth signal, for example, but the presence frequency is not detected, the threshold for the presence frequency may be lowered as well.

In a feature of any of the above mobile device location (and corresponding driver detection) embodiments, it is useful to be able to determine when the driver may be attempting to circumvent the system by reaching out and holding the mobile device on the passenger side of the vehicle, by having a passenger hold the mobile device for the driver but in a manner in which it is viewable or useable by the driver, or by having the mobile device mounted or positioned outside the driver's seat area but still oriented so that the driver can see and interact with the mobile device.

Determining when a mobile device is being held, position, or oriented in a manner that can be viewed or used by the driver, even when not in the driver's seat area of the vehicle can be accomplished in several different ways. For example, it is possible to compare the heading of the vehicle with the orientation of the mobile device. In one implementation, this can be accomplished using only the sensors on the mobile device as follows: using the GPS on the mobile device, the heading of the mobile device can be detected. As this matches the heading of the vehicle, this provides a number range between 0-360 degrees—indicating the orientation of the vehicle relative to magnetic north. Using the magnetic sensor on the mobile device, the orientation of the mobile device relative to magnetic north can also be determined—also as a number range between 0-360 degrees. This is the compass orientation of the vector perpendicular to the back side of the phone (the side opposite the display). These two numbers can then be compared. For example, if the heading of the car is 0 degrees (straight north) while the orientation of the phone is 90 degrees (back side of the phone is pointing due east), then the system determines that the mobile device may be in a circumventing use orientation. Clearly, a passenger would not typically hold her mobile device in this position.

As a second example, if the heading of the car is 0 degrees (straight north) while the orientation of the mobile device is 10 degrees (back side of the device is pointing just slightly east of north), then the system determines that the mobile device is in an "allowed" use orientation, as this would be considered within a valid range of orientation for passenger use. The exact threshold of degree of difference is configurable, so as to accommodate varying vehicle cabin geometries, individual user movement patterns, and parent/administrator strictness.

In some instances, it may be desirable for the passenger to hold her mobile device in a position in which the screen is facing the driver. One example would be when the passenger holds her mobile device against her ear, in which case the screen could still be "facing" the driver, but would not in fact be viewable by the driver. This scenario can be filtered out as an exception—using additional data available from the mobile device, such as screen proximity sensor, screen on state, or the current call status.

The gyroscope and magnetometer of the mobile device can also provide useful information to help identify the orientation of the mobile device in the vehicle since many applications can be viewed in either a portrait screen orientation or in a landscape screen orientation.

As stated previously in conjunction with FIG. 1, the mobile device 150 preferably makes use of two embedded or downloaded applications or software components, each designed to handle and make use of the data or communications made by the control device 75. The first application or software component is preferably designed to process the audio signals that are transmitted to the mobile device for enabling the mobile device to determine whether it is located in the driver quadrant or, in a feature, located in the passenger quadrant but being positioned or held in such a manner that it is likely to be useable or viewable by the driver, which is important to prevent a driver from trying to circumvent a distracted driving application.

Figure 5:
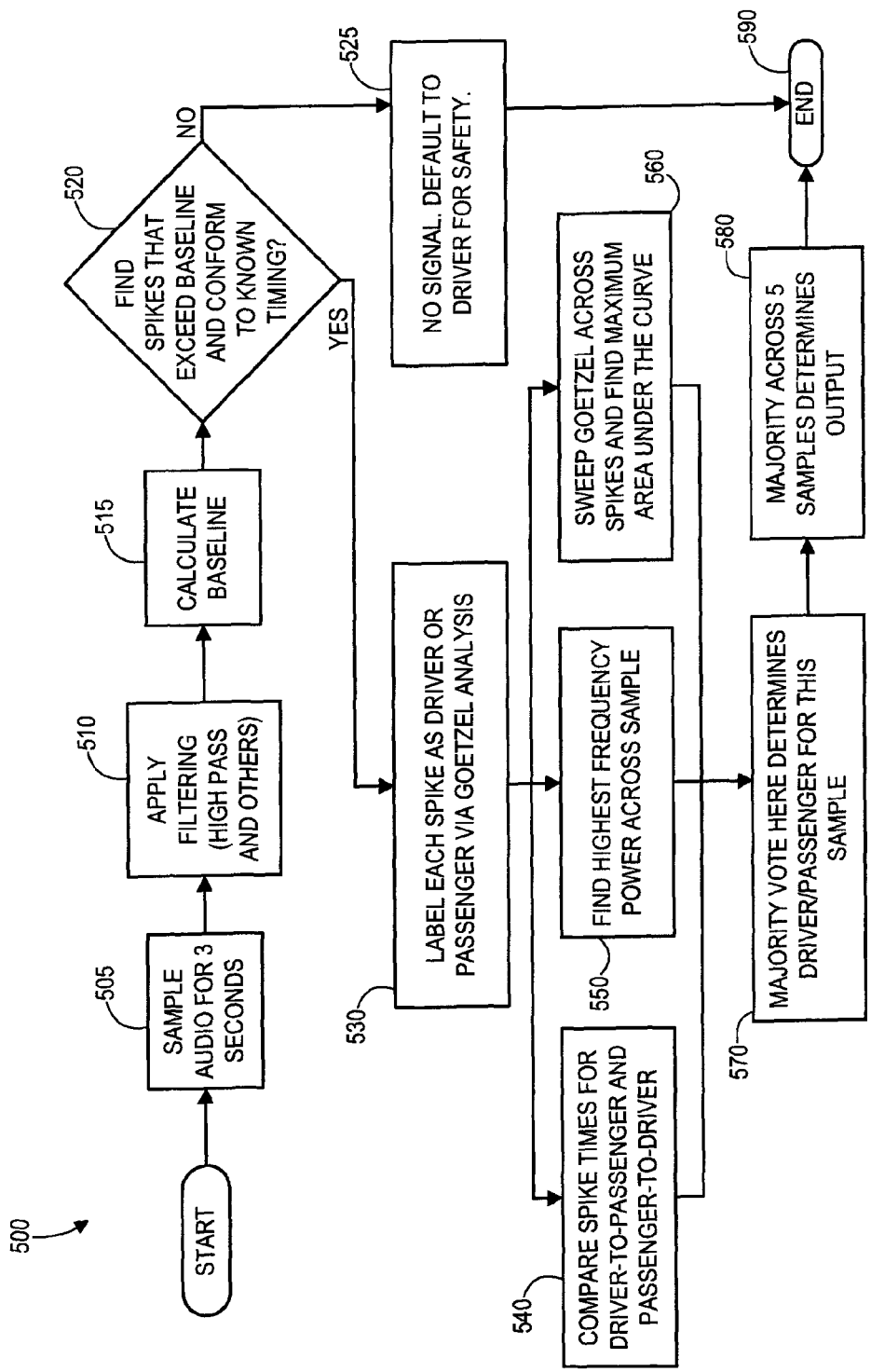
FIG. 5 is a flow chart of the steps used by a mobile device for processing audio signals generated by the control device illustrated in FIGS. 1-4.

The flow chart of FIG. 5 illustrates the process 500 by which the mobile device 150 determines whether it is located within the driver quadrant of a vehicle 110 when used in conjunction with a control device 75 configured, according to the preferred embodiment, to transmit a first audio signal toward the driver and a second audio signal directed toward the passenger. Preferably, the first audio signal includes three separate audio frequencies (e.g., 19100 hz, 19250 hz, and 19500 hz) played for a specific period of time, such as 50 ms. After 50 ms of playing, all sound playing stops for another predetermined period of time, such 200 ms. After 200 ms of silence, the second audio signal includes three different audio frequencies (e.g., 19200 hz, 19300 hz, and 19450 hz) played for another specific period of time, such as 50 ms. After 50 ms of playing, the system again pauses another predetermined period of time, such 200 ms, with silence before starting over by transmitting the first audio signal again.

The audio processing application of the mobile device first samples the audio signals transmitted to the mobile device (Step 505). Filtering, such as high pass and other filtering, is used to reduce or minimize noise from the audio sample (Step 510). A baseline of intentional and ambient noise captured during the sampled audio is calculated (Step 515). The process 500 then determines whether there are any audio signal spikes that exceed the calculated baseline and that conform to the predetermined or pre-set audio signals—based on frequency and based on expected duration of such signals and delays between such signals (Step 520). If no audio signal spikes are detected, the process assumes that the mobile device is not in a vehicle, not in a vehicle that is moving, or not in a vehicle that has a suitable control device installed or activated (Step 525). In such a scenario, the mobile device cannot determine its location in the vehicle based on any signals from a control device; therefore, the process for seeking audio signals from a control device either ends or starts over again (Step 590).

If one or more audio signal spikes are detected at Step 520, the process 500 then labels each such detected audio signal spike as either a "driver" or "passenger" audio signal using Goetzel analysis (Step 530). Three separate analyses are then performed by the process 500 on each labeled audio signal spike. In one analysis, the spike times for driver-to-passenger and passenger-to-driver are compared (Step 540). In a second analysis, the highest frequency power audio signal is identified (Step 550). In a third analysis, a Goetzel analysis sweep is performed across all of the detected spikes and a maximum area under the curve is calculated (Step 560).

The process 500 then compares the results from the three separate analyses and initially determines whether the mobile device is located in the driver quadrant or not—based on the results of at least two of the three analyses performed on the audio sample (Step 570). The audio processing application of the mobile device then finally determines whether the mobile device is located in the driver quadrant or not—based on the results of at least three of the determinations made at Step 570 (Step 580).

All of the above methods using the control device (and any of the exemplary methods described below that do not use the control device) for determining if a mobile device is in the driver quadrant or one of the other quadrants within the vehicle are useful for a variety of reasons based on the end use application. For example, in some instances, a decision of whether to block or not to block functionality of the mobile device may be made based on the location of the mobile device. In other scenarios, deciding whether to audit the mobile device's activities may be made based on the quadrant. For example, in a UBI scoring application, the mobile device may not go into blocking mode, but by knowing this mobile device is the one that is in the driver quadrant and using the mobile device as a proxy to identify the individual driving, more accurate scoring models can be constructed. In other uses, the mobile device in the driver quadrant may be used automatically to "sign in" for hours-of-use type applications, commonly found in FMCSA vehicles. Yet another use of quadrant identification could be for accident reconstruction. An accident could be reconstructed in which the location of various mobile devices within the vehicle could be used and potentially cross-referenced with carrier data corresponding to each mobile device before, during, and after the accident.

It should also be noted that the quadrant in which a mobile device is located may change over time. For instance, when a vehicle first starts moving, the mobile device in the driver quadrant may be identified and go into blocking/auditing/scoring modes. The system could be continuously monitoring its location to help determine when its quadrant location within the vehicle may have changed. Upon quadrant change, different actions may occur. For example, call blocking may change to a new mobile device that moves into the driver quadrant, while the mobile device that has moved out of the driver quadrant may be freed up to make calls. Similarly, blocking/auditing/scoring applications can switch from one mobile device to another depending upon which one is within the driver quadrant at any given time.

It may also be useful to know if more than one person is in the vehicle. For instance, if only one person is in the vehicle, it may be desirable for that user's mobile device or devices to be blocked/audited/scored regardless of the quadrant in which such device(s) are located. Therefore, various methods outlined above may be useful in determining if more than one mobile device is in the vehicle and where each mobile device is located within the vehicle. Each mobile device may communicate with a centralized server to help facilitate this discovery, or mobile devices locally may be configured to communicate with each other using Bluetooth or other short-range communication mechanisms. In some implementations the mobile devices may broadcast their own audible tones to help with this determination. For example, while in the vehicle, or in motion only, the mobile device may pick an unused frequency and broadcast its own audio signal. This could be accomplished in many ways, such as having a pool of available frequencies from which to choose. The other mobile devices in the vehicle can detect and sample this pool of frequencies to determine if another mobile device has "checked in" within the vehicle. In yet another implementation, vehicle specific sensors may be utilized. Such vehicle specific sensors include, but are not limited to, seat belt detectors that detect which seat belts are engaged, weight sensors on the seats that help identify if the seat is occupied, and the like.

Transmission of Vehicular Status Data from Control Device

As stated previously, in addition to transmitting signals used to determine the location of the mobile device within the vehicle, the control device 75 is also configured to transmit or broadcast vehicular status data. Preferably, the vehicular status data includes information that can be determined or detected by the control device itself, such as motion of the vehicle, speed of the vehicle, location of the vehicle, cabin temperature within the vehicle, sound or ambient noise within the cabin of the vehicle at any point in time. Preferably, such vehicular status data can be transmitted or broadcast by the control device 75 using classic Bluetooth (BT) communication protocols, using Bluetooth Low Energy (BTLE) communication protocols, or both. Preferably, such vehicular status data is transmitted in real time, on a periodic basis; however, in some embodiments or circumstances, especially if vehicular status data has accumulated and been stored in memory on the control device 75 without previously being transmitted to a receiving mobile device or vehicle application, such vehicular status data may be transmitted in bulk or in non-real time scenarios to a mobile device—once one such receptive device comes within communication range of the control device 75.

Figure 6:
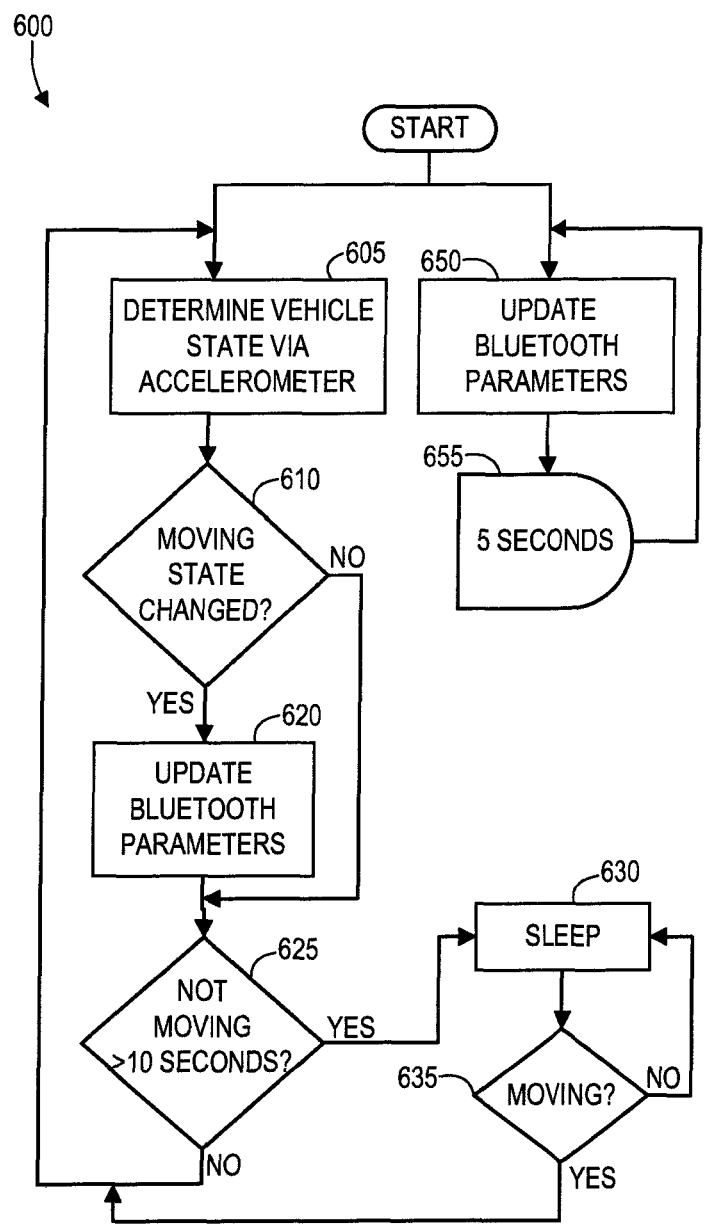
FIG. 6 is a flow chart of the steps used by the control device of FIGS. 1-4 for detecting vehicle status and for transmitting vehicular status data in accordance with the embodiment of FIG. 1.

The flow chart of FIG. 6 illustrates the process 600 by which the control device 75 communicates vehicular status data to one or more mobile devices within a vehicle. As stated previously, the control device 75 preferably remains in a powered-down state to preserve its battery. Thus, the control device 75 monitors its built-in accelerometer in order to detect when the vehicle in which it is installed or mounted begins to move (Step 605). Upon detection of movement, the control device 75 powers on. The process 600 continues to monitor the output of its accelerometer to determine any changes in movement of the vehicle (Step 610). Any change in movement of the vehicle, including its rate of acceleration or deceleration, is recorded and stored in memory on the control device. Preferably, such information is embedded in a suitable data field that will be transmitted by the control device using one of many potential communication protocols (Step 620). As stated previously, such vehicular status data can be transmitted or broadcast by the control device 75 using classic Bluetooth (BT) communication protocols, using Bluetooth Low Energy (BTLE) communication protocols, or both. Specific details about transmission of such data using classic BT and BTLE are described in greater detail hereinafter.

If the accelerometer of the control device detects (Step 625) that the vehicle has not moved for a predetermined period of time, such as ten (10) seconds, then the control device returns to a sleep or powered-down state (Step 630). The control device remains in its sleep of powered-down state until movement is again detected (Step 635).

Preferably, the control device 75 periodically updates the vehicular status data embedded in the suitable data fields that will be transmitted by the control device (Step 650). In a preferred embodiment, such information is updated every five (5) seconds (Step 655).

As will be appreciated, for control devices that include a GPS module, the vehicular status data includes not only the accelerometer data, but also geographic location data, vehicle speed, and corresponding time-based correlation data associated with such information.

Finally, it will be appreciated by one of skill in the art that the control device described herein can be configured just to perform one or the other of its primary functions. For example, one embodiment of the control device can be configured just to transmit audio signals for use in detecting the location of mobile devices within a vehicle. Such control devices can be constructed without inclusion of an accelerometer, GPS, data transmission module, and other sensors described above. Conversely, another embodiment of the control device can be configured just to detect and transmit vehicular status data. In such embodiments, such control devices can be configured without an audio microprocessor and speakers.

Transmissions Using Classic Bluetooth Protocols and Friendly Name Broadcasts

As will be appreciated from an understanding of U.S. Pat. No. 8,527,013, classic Bluetooth (BT) communication protocols can be used by the control device 75 of the present invention to transmit relevant vehicular status data to one or more mobile devices located within a vehicle and/or to one or more computer systems and applications associated with the vehicle.

As will be appreciated by one of skill in the art, with conventional Bluetooth communication protocols, once a single mobile device 150 has "paired" and connected with the Bluetooth module of the control device, other mobile devices are not able to connect with the Bluetooth module of the control device until the original mobile device disconnects and the pairing is dropped. Thus, with conventional Bluetooth connectivity, only one mobile device can be used in a vehicle at a time. That may be fine for some or many applications and uses, but not for all.

Therefore, preferably, the Bluetooth connective modules on the control device and installed within the system application or software component installed or used by each compliant mobile device in the vehicle and compliant computer system associated with the vehicle is configured to allow for "one to many" connections with the Bluetooth module of the control device.

In one embodiment, multiple mobile devices and vehicle computer systems can connect simultaneously to the Bluetooth module of the control device through the use of piconets. The Bluetooth module of the control device acts as the "server" and is designated as the "master" device and each associated mobile device or vehicle computer system is designated as a "slave." However, to initiate the connection, the mobile device or vehicle computer system initiates the connection initially as the "master" device. Conventional Bluetooth protocols support a procedure called the master-slave switch, which allows the mobile device or vehicle computer system to become the slave after initiating this initial connection. However, not all mobile devices or vehicle computer systems, at least currently, are configured to enable master-slave switching.

For this reason, in another preferred embodiment, the present system does not use the "normal" or "orthodox" connection or paired oriented protocol for Bluetooth connections. Instead of initiating a connection in the normal Bluetooth sense using the mobile device, the Bluetooth module of the control device communicates its "state" or vehicular status data in a broadcast manner to any listening mobile devices or vehicle computer systems in Bluetooth range. It does this by changing its "friendly name" to represent the current state of the vehicle and any available vehicular status information. This technique enables the system to support a much wider array of mobile devices and vehicle computer systems while also retaining the ability to communicate vehicular status data to multiple mobile devices or vehicle computer systems in the same vehicle using a single Bluetooth transmitter associated with the Bluetooth module of the control device. For example, in one simple embodiment, when the control device detects vehicle movement, an acceleration value can be obtained from the accelerometer built into the control device. Likewise, if the control device has its own GPS component, vehicle location and speed can also be obtained. This data can then be embedded and incorporated into the "friendly name" of the Bluetooth module on the control device that is then broadcast to any listening devices within range of the control device, which would typically include any mobile devices within the cabin of the vehicle and, potentially, one or more vehicle computer systems. Each mobile device or vehicle computer system, having the system software installed thereon, would then be able to detect the "friendly name" broadcast and extract the relevant vehicular status data. This vehicular status data, along with the previously determined mobile device location data, can then be used to advantage for a wide range of purposes—depending upon the other software applications, components, or modules installed on each mobile device or vehicle computer system. Each mobile device or vehicle computer system can then be configured to search for and detect the Bluetooth "friendly name" at pre-set intervals to ensure that updated vehicular status data is obtained on a desired and periodic basis.

In another preferred and more sophisticated embodiment, the Bluetooth friendly name of the Bluetooth module of the control device can be updated on a periodic basis (e.g., every 3 seconds) to provide multiple pieces of vehicular status data—when the amount of available data exceeds the field parameters of the Bluetooth friendly name. Since it may not be possible to send all potentially relevant vehicle state or status data in a single friendly name data transmission, the information transmitted can be divided into frames. Obviously, the more characters that the transmitter is capable of using as its Bluetooth friendly name, the fewer frames and fewer cycles of name transmissions required to pass on all relevant data to the listening devices.

The amount of data and information that can be sent as part of the Bluetooth "friendly name" depends upon the software and hardware used. For example, some Bluetooth transmitters have a 16 character limitation in regards to how long the "friendly name" can be; others have 20, 28, or 30 character limits, but the exact length is not important and will vary based on the application and the Bluetooth hardware in use at the time. Regardless of the exact size or character limitation of the "friendly name," the system is able to accommodate any amount of information transmitted by using frames and pre-set protocols that identify what information is being transmitted and by identifying or knowing the number of character fields that follow a specific frame identifier and, potentially, how many friendly names are transmitted as part of a single data broadcast. Such information can be pre-set or identified within the friendly name itself through use of an "end" character that specifies the end or last piece of information in a series of broadcasts and which would indicate that the next broadcast would represent the start of a new broadcast of information.

Transmissions Using BTLE Protocols

Bluetooth low energy (BTLE) wireless technology is an ultra-low power (ULP) 2.4 GHz RF technology designed to bring wireless links to products that currently use: proprietary wireless that is unable to communicate with other wireless protocols; wired connections; or have (at present) no wireless communication provision but would benefit from one.

Bluetooth low energy (BTLE) wireless technology is a ULP wireless solution featuring:
  Ultra-low peak, average and idle mode power consumption;
  Ultra-low cost plus small size for accessories and human interface devices (HID);
  Minimal cost and size addition to handsets and PCs; and
  Global, intuitive, and secure multi-vendor interoperability.

Bluetooth low energy (BTLE) wireless technology was designed from the outset to be a ULP technology whereas classic Bluetooth technology is a "low power" wireless technology. This difference dictates that the operational characteristics of Bluetooth low energy wireless technology and classic Bluetooth wireless technology are opposites. Classic Bluetooth wireless technology is a "connection oriented" radio with a fixed connection interval ideal for high activity links like mobile phones communicating with wireless headsets. Among several measures to reduce the power consumption, BTLE wireless technology employs a variable connection interval that can be set from a few milliseconds to several seconds depending on the application. In addition, because it features a very rapid connection, Bluetooth low energy wireless technology can normally be in a "not connected" state (saving power) where the two ends of a link are aware of each other, but only link up when necessary and then for as short a time as possible.

There are three characteristics of Bluetooth low energy technology that underlie its ULP performance: (i) maximized standby time, (ii) fast connection, and (iii) low peak transmit/receive power. Bluetooth low energy technology uses just three "advertising" channels to search for other devices or promote its own presence to devices that might be looking to make a connection. In comparison, classic Bluetooth wireless technology uses 32 channels. This means Bluetooth low energy wireless technology has to switch "on" for just 0.6 to 1.2 ms to scan for other devices, while classic Bluetooth wireless technology requires 22.5 ms to scan its 32 channels. Consequently, Bluetooth low energy wireless technology uses 10 to 20 times less power than classic Bluetooth wireless technology to locate other radios.

Once connected, Bluetooth low energy wireless technology switches to one of its 37 data channels. During the short data transmission period the radio switches between channels in a pseudo-random pattern using the Adaptive Frequency Hopping (AFH) technology pioneered by classic Bluetooth wireless technology (although classic Bluetooth wireless technology uses 79 Bluetooth low energy wireless technology features a raw data bandwidth of 1 Mbps)—greater bandwidth allows more information to be sent in less time. A competing technology that features a bandwidth of 250 kbps, for example, has to be "on" for eight times as long (using more battery energy) to send the same amount of information. Bluetooth low energy wireless technology can "complete" a connection (i.e., scan for other devices, link, send data, authenticate and "gracefully" terminate) in just 3 ms. With classic Bluetooth wireless technology, a similar connection cycle is measured in hundreds of milliseconds; more time on air requires more energy from the battery.

Bluetooth low energy wireless technology also keeps a lid on peak power in two other ways: by employing more "relaxed" RF parameters than classic Bluetooth wireless technology, and by sending very short packets.

When using BTLE to communicate vehicular status data to one or more mobile devices, there are several things to consider. By default, BTLE allows for the communication of data without requiring pairing. The BTLE specification also allows for multiple devices to be simultaneously connected and sharing data. However, in practice, it has been found that most BTLE modules on the market can only support one device connected at a time. This introduces issues if more than one person or mobile device is in the cabin of the vehicle. To overcome this limitation, several workaround methods have been developed.

In one method, a unique identifier is embedded in the BTLE advertising data, so the mobile device can immediately recognize the unit as the one with which it will interact. In addition, vehicle status information can be embedded into the service UUID being advertised. In this manner, it is possible to transmit basic information, such as moving, not moving, and vehicle off status information by utilizing 3 different service UUIDs. The service UUID that is present indicates which mode the mobile device should be in. Utilizing this method, it is possible to prevent the mobile device from initiating a "connection" to the BTLE device. By not connecting, it is possible to have multiple devices simultaneously retrieve vehicle status data.

In addition to utilizing the service UUID, it is possible to overwrite the advertising data with additional information, such as, for example, using an approach outlined previously consisting of various frames of data. This allows the system not only to communicate vehicle status without connecting, but also to communicate additional vehicle metrics, such as braking, mileage, and speed.

In another implementation, it is possible to create a custom BTLE profile. This profile has multiple characteristics consisting of ASCII strings. Once the mobile device connects, it will read all characteristics. Once all characteristics are read, or a timeout is exceeded, the mobile device automatically disconnects from the BTLE device. In an alternative implementation, these characteristics can use the BTLE indication mechanism. Using the indication mechanism, the remote BTLE device can determine when the mobile device has read all of the characteristics. The BTLE unit will then disconnect the mobile device. Having the external hardware device automatically disconnect the mobile device at a set interval or at the completion of reading characteristics is critical to ensure multiple devices can retrieve the requested data in a timely fashion. This allows one unit to service multiple mobile devices and prevents possible denial of service.

Data can be retrieved via BTLE in multiple manners. For example, multiple custom characteristics are pre-defined. More than one custom characteristic is necessary since there is a length limit on a single characteristic, and the sum width of available data fields will likely exceed that value. These characteristics will be read-only by the client, and are configured such that the client is notified when the characteristics change.

Another method for BTLE data transmission is to use two custom characteristics. The first characteristic will hold a chunk of data—the next chunk of the data in the stream of data to be transmitted. The second characteristic will be readable and writable by the BTLE client, with notify enabled. It will be in one of two states. In state A, it will indicate that there is a new chunk available to be read. After the client has read the chunk, it will write state B. The BTLE server will then see that the client has read the chunk, and will load the next chunk, again setting the state back to state A.

Transmissions Using Other, Non-Bluetooth Communication Protocols

Instead of BT or BTLE communications, it is also possible, in alternative embodiments, for WiFi to be used as a means for transmitting or broadcasting vehicular status data from the control device. Such information may be streamed over WiFi directly from the vehicle to a receiving device. In a mechanism similar to non-pairing Bluetooth implementations describe previously, the SSID of the WiFi network may be altered to communicate vehicle status. Furthermore, a web service could be running on the control device within the vehicle. Again, such device or hardware may be either aftermarket or OEM installed. This web service would respond to various queries indicating the state of the vehicle to such receiving device.

In an alternative embodiment, audio itself could also be used to transmit or broadcast vehicular status data. Using DSP techniques, data can be transmitted from the vehicle to software on mobile devices within the vehicle or to software being run by or on the vehicle itself. Essentially, any of the techniques used in analog modems may be used here, since the basic constraints are the same: transmit data via audible sounds over a noisy channel. These techniques include frequency modulation, amplitude modulation, or phase modulation. The number of different allowed frequencies/amplitude/phases will determine throughput, with more allowing higher throughput, but less allowing better operation in high signal-to-noise environments. Combinations, where more than one of these factors is modulated, may also be useful. Also, error detection schemes, such as parity or CRC32, are useful for finding and correcting errors.

Determining Location of Mobile Device in a Vehicle without Use of a Control Device Numerous procedures for determining the location of a mobile device within a vehicle, whether in the driver quadrant or in a passenger quadrant, using the control device of the present invention, are described in detail above. However, there are other procedures and techniques described in greater detail below, using suitably configured applications or software components installed or embedded on the mobile device, that can be used by such mobile device to determine its location within the vehicle.

In one embodiment, the location of the mobile device can be determined based on common engine noises and frequencies. For example, when driving, the left side of the engine will generate different sound patterns than the right side. Using this information, it is possible to determine if the mobile device is on the left or right side of the vehicle. After determining the vehicle's year/make/model, the mobile device would download a configuration file for the year/make/model of the current vehicle. This configuration file contains parameters for this vehicle, which can then be loaded into variables used by a combination of DSP and neural network algorithms. These algorithms are then used to determine the position of the mobile device within the cabin of the vehicle. In an alternative implementation, the mobile device preferably already contains all known configurations and can process the sounds without downloading additional information. In yet another implementation, the recorded sound capture will be sent to the cloud for further processing and to match the sound with the appropriate vehicle and to determine the quadrant in which the mobile device is located.

In another embodiment, the location of the mobile device within a vehicle or other closed environment can be determined by using various sensors on the mobile device. One such sensor is the magnetometer found on many mobile devices. When the mobile device is on the left side of the vehicle, the left door speaker will be closer than the right door speaker. Using this information one can determine if the mobile device is located in the driver quadrant. Accuracy of this will depend on orientation of the mobile device relative to the vehicle. However, this is not an issue, since the mobile device will typically be held in a common position when the driver actually tries to use it. Further, orientation of the mobile device relative to the ground can be helpful as well. In some situations, the magnetometer reading may be best utilized relative to the other mobile device located within the vehicle to account for other magnetic instruments distorting the signal. The comparison data can be sent to a cloud-based server, or transmitted locally among the mobile devices located within the vehicle. In another implementation, using a combination of sensors on the vehicle, such as magnetometer, accelerometer, gyroscopes, and other common sensors, it is possible to determine the approximate location of a mobile device within the vehicle. For example, when a vehicle makes a right turn, the vehicle tilts on its suspension. The side closest to the right side will feel a force pushing downward while the side closest to the left side will feel a force rising upwards while the suspension tilts. Utilizing this information, mobile devices within the vehicle can make assumptions about which quadrant it is likely located. This processing could happen individually with each mobile device, or in a manner in which the information is shared amongst the mobile devices within the vehicle either locally utilizing Bluetooth or other short range signals, or by uploading the data to a cloud-based server for further processing.

With regard to the orientation of the mobile device relative to the vehicle, another technique may also be used. The mobile device can determine the heading, and thus orientation, of the vehicle via GPS. Additionally, the mobile device can determine its own orientation via magnetometer and tilt sensors. Thus, the mobile device can determine its orientation with respect to the vehicle. The vector seen by the magnetometer of the mobile device may change as the mobile device rotates. However, it may also change as the position of the mobile device relative to a speaker changes. The mobile device can differentiate between these two conditions by looking for corresponding changes in the gyroscope to correlate with the observed rotation seen by the magnetometer. If there is no correlation, then the mobile device may be near a speaker. This information, combined with determination of its orientation relative to the vehicle, allows the mobile device to identify if it is near a speaker on the right side or the left side of the vehicle, allowing yet another method for driver identification.

In yet another embodiment, Bluetooth signal strength can be used. The mobile device with the highest Bluetooth signal strength relative to the control device would likely represent the mobile device closest to the control device. Again, this signal strength information, along with the model information of the mobile device and its orientation to ground, can be sent to the cloud, where variances in model sensitivity of the mobile device to Bluetooth at a given orientation can be taken into account.

In another embodiment, a challenge and response system can be used. If the control device is configured with a means of detecting cellular signal usage in the driver's seat area only, the control device can issue a challenge to each mobile device in the vehicle. For mobile device A, the control device may request the mobile device to make multiple quick data connections. If the control device detects that the mobile device in the driver seat performs this action, the driver mobile device would be identified. The control device would then issue a challenge to the remaining mobile devices. After each challenge/response session, the control device will have determined which mobile device(s) are located in the driver quadrant and policy can then be applied accordingly to all the mobile devices in the vehicle. If the control device is capable of differentiating calls vs. SMS vs. data transmissions, some combination of these may be used for more sophisticated challenge/response sessions.

Another embodiment, using cellular signal detection, can be implemented without requiring software to be installed on the mobile device. In this implementation, the control device monitors usage of the mobile device and compares generated signals to the known activity generated by mobile device(s) potentially used by the driver. For example, assume that the control device detects two (2) incoming SMS messages and one (1) outgoing SMS message at times x, y, and z, respectively. By comparing usage details contained within the carrier's network at times x, y, and z, the mobile device positioned within the driver's quadrant could be identified in real time. Once the proper mobile device has been identified as being in the driver quadrant, usage of the mobile device can be shut off within the carrier's network, or a signal can be sent to software running on the mobile device instructing it to block further activity.

The mobile device in the driver quadrant can also be narrowed down and/or identified without any activity manually being generated by the mobile device. For instance, by detecting patterns in the cellular signal generated by the mobile device in the driver quadrant, the model of the mobile device can be determined—which can further aid in identifying the mobile device. The method for detecting patterns within the cellular signal uses all methods known in the art, including neural networks and other AI methods. In addition to detecting patterns, signals can be generated by the carrier network and then detected locally within the driver quadrant. An example would be for the cellular network to send information to each mobile device within the vehicle and potentially within the driver quadrant of the vehicle. The control device would then match the generated signal with the appropriate mobile device.

In another embodiment, consider the scenario in which there is a mechanism to detect data bursts from the mobile device in the driver quadrant. This procedure is capable of building a data set of when the mobile device in the driver quadrant and what data is used over time. Consider, also, that there is an application on each mobile device in the cabin that monitors data usage on the mobile device over time or monitoring is provided through the carrier network without requiring an application on the mobile device itself. Mobile devices periodically perform data transactions even when in standby, such as checking email or Facebook status. Clearly, all of these data sets can be uploaded to a server, where they can be processed and a correlation found between the data set from the data detection mechanism for the driver quadrant and the data set from one or more other mobile devices in the vehicle. These correlation results can then be sent back down to the mobile devices within the vehicle, letting the mobile devices determine whether they are in the driver quadrant or in one of the passenger quadrants. Instead of uploading the data for processing via a server, the data may also be processed in-cabin using local communication techniques to transmit the data to a processing unit. The data may be transmitted via audible sound, ultrasonic sound, Bluetooth, BTLE, WiFi, NFC, infrared, visible light, or other mechanism. The processing unit may be one of the mobile devices itself or an application installed on one of the mobile devices, may be installed on or part of the control device, or may be a dedicated processing unit or processor installed on or within the vehicle.

In another embodiment, it is possible to use more than one mobile device to record or detect information from various sensors: GPS, accelerometer, manometer, light detector, camera, etc. The information can then be collected and compared to one another—either locally or within the cloud—to help determine the relative location of the mobile devices within the cabin of the vehicle. For example, imagine a scenario in which two mobile devices are running system software and collecting GPS location. GPS is typically accurate within a few feet. If, over the course of a drive (or vehicle outing), one mobile device continually reports a GPS location slightly to the left of the other mobile device, it could be determined which mobile device is the driver quadrant and which is in the passenger quadrant—depending upon the country and type of vehicle, and based on whether the driver of the vehicle is likely positioned to the right or left of passengers in the vehicle. Similar data could show whether one mobile device is further to the front or rear of the vehicle. Such data can then be used to determine which mobile device belongs to the driver. Similar scenarios could be constructed using any number of sensor data collected. Comparing the relative tilt or angular acceleration recorded by the mobile devices while turning represents another data point that may be used to advantage.

In another embodiment, it is possible to use an application installed on the mobile device, such as iBeacon, which is capable of transmitting a BTLE transmission, which can be detected and responded to by an OBDII device or control device. The BTLE data exchange provides distance data that can be used by the mobile device to determine how far away it is from the responding OBDII device or control device. Such distance data can be used alone, or in conjunction with one or more of the device location techniques described herein, to determine the likely location of the mobile device—whether in the driver quadrant, front seat passenger quadrant, or back seat passenger space.

All of the methods for determining or aiding in determining which mobile devices are located within particular quadrants (whether using the control device or not) could be used in various combinations with one another. While the methods are presented herein individually for ease of explanation, a real world solution can use one or more of these techniques for more accurately determining the location of mobile devices within vehicles.

Applications Making Advantageous Use of Device Location and Vehicular Status Data (1) Distracted Driving Applications for Conventional Mobile Devices In a distracted driving prevention or risk reduction system, there is a significant need and it would be very advantageous to be able determine the location of a mobile device within the vehicle—whether in the possession of the driver, a front seat passenger, or a passenger in the backseat. Once the location (or relative location) of the mobile device is known within the vehicle, the distracted driving prevention or risk reduction system can be configured to behave differently with different mobile devices—based on such location determinations.

For example, in some circumstances or applications, only the driver's mobile device needs to be blocked (i.e., monitored, controlled, etc.)—while the passenger devices (front seat and/or backseat) are allowed to remain unaffected. Alternatively, there may be circumstances or applications in which it is desirable for the system to be configured to block all mobile devices regardless of which mobile device is in the driver seat, or to open up certain aspects of the mobile device for non-drivers.

Preferably, such distracted driving prevention or risk reduction are designed to improve upon the safe operation of a vehicle by a driver who has a mobile device, by limiting, controlling, managing, or preventing use of some or all functionality of the mobile device while the vehicle is in operation by the driver and/or in motion above a threshold speed, whether in reverse or forward direction. Preferably, a default or configurable policy, rule base, or set of protocols are installed on, uploaded to, or otherwise accessible by the mobile device to define what functionality of the mobile device is limited, controlled, managed, or prevented and under what circumstances.

Preferably, the distracted driving prevention or risk reduction applications described herein use rules-based policies that are defined and targeted to individual users, devices, and vehicles, or they may be targeted to fleets of vehicles and selectively to groups or subgroups of employees or other categories of people using a centralized policy distribution and management system.

Preferably, there are one or more "default" or pre-defined policies usable and pre-configured for individual or corporate users and for different types of mobile devices—based on the capabilities and functionality of such mobile devices and based on the typical functions of the mobile device that are prevented, based on when such functionality needs to be prevented, and based on what functionality should not be prevented or is selectively permitted (such as the ability to make an emergency phone call, access a GPS map application, and the ability to text or call to or from specific numbers or people included on a "white" list or permitted list).

In addition, some companies may want to allow some of their corporate software applications to be accessible to their employee drivers even while operating a vehicle, as part of their job. The system allows an administrator to define customized policies for individuals or for larger groups of people (e.g., all family members, all kids in the family, employees of a division, specific types of employees, or all employees of the company, and the like). In a preferred embodiment, mobile devices and/or vehicles that are not integrated into the system or that do not have suitable system software application(s) installed on the mobile device will not be impacted or interfered with by the system.

Preferably, the vehicular status data provided by the control device and transmitted to the mobile device is used by software application installed on the mobile device, along with the mobile device location determination, to limit, control, manage, or prevent use of some or all functionality of the mobile device based on the applicable rules-based policy in effect on the relevant mobile device.

Once it has been determined which mobile device(s) within a vehicle should be disabled, the user must be prevented from accessing some or all functions of the mobile device, based on the policy associated with the user, with the vehicle, or with the mobile device—as may be customized based on environmental or other factors, such as location of the vehicle, time of day, weather conditions, etc.

Preventing a user from accessing specified functions of the mobile device may be accomplished in a number of ways. For example, one way to prevent access to all functions of a mobile device is to continuously display pop-up dialogs on the screen of the mobile device. These would appear at a rate such that no matter how fast the user dismisses the box, he never has time to access any function of his mobile device. Another way is to continuously throw up a full screen dialog or screen, potentially containing graphics and text. All touchscreen presses will be intercepted and thrown away by this dialog. Pressing the home button will simply cause the dialog to disappear for a very short time, due the continuous nature of its appearance. Another way is to allow the user to attempt to access some functionality of their mobile device, but to immediately close any application that is opened by the user. This may be accompanied by displaying a dialog box or other notification warning the user to be safe.

(2) Distracted Driving Applications for Apple iOS-Types of Mobile Devices

Traditionally, distracted driving prevention and risk reduction systems have relied on a software application installed on or accessible by the mobile device located within the vehicle that receives a signal that then triggers a restriction of usage of the mobile device. This signal may originate locally from a sensor on the cell phone, such as GPS or accelerometer, or may originate from an external device either in the cloud or communicating over some wireless protocol (such as a transmission from the control device). Once the application receives or detects the trigger signal, the application on the conventional mobile device itself implements the usage restriction of the mobile device—thus, interfering with all or selected other applications and functionality of the mobile device. A common mechanism to perform mobile device blocking is to simply put up a screen on the mobile device that prevents the user from interacting with other applications. In addition, many applications will also watch for incoming/outgoing calls and forcibly end a phone call using APIs supplied by the operating system on the mobile device.

This well-established mechanism has worked well for most types of mobile devices. However, several manufacturers of mobile devices, such as Apple, do not allow one installed application to "interfere with" other applications on the mobile device. This restriction or prohibition has prevented distracted driving software applications from working on these platforms. Even if one could design a solution or means to enable one application to restrict usage of other applications, such distracted driving solutions must still be submitted through Apple's application review and approval process, which results in such application not being approved for sale or support through the Apple App Store, since such an application violates Apple's standard "application terms of service."

For these types of platforms, a different method for device restriction can be implemented. Instead of relying on the application installed on or accessed by the mobile device to perform the actual usage restriction, it is possible to use an external hardware device (in this case, the control device) to perform the restrictions of the mobile device. For example, many mobile devices have supported external keyboards for a number of years. These external keyboards operate on standard protocols, such as HID (human interface device) or HID over GATT, for Bluetooth low energy applications.

Utilizing these established protocols, a system can be developed that is capable of restricting usage on these mobile platforms. For example, when the mobile device user opens an application, such external hardware device will receive a signal indicating improper usage and transmit a "key press," which has the same effect as if the user had pressed a key on an external keyboard. In most cases, a key press such as "home key" or "power key" is desirable. In the example in which a user opened or attempted to use an inappropriate or unauthorized application (e.g. based on the rules-based policy), it is possible to transmit a "home key" press, which would have the effect of minimizing this inappropriate or unauthorized application. This produces the desired effect of application restriction. This opens up a whole new class of mobile devices, which can implement a distracted driving policy and not have to worry about the application not being approved.

This mechanism could also be utilized in standalone manner—without any application needing to be installed on the mobile device. In this implementation, the external hardware device (e.g. control device) sends appropriate key presses on set intervals making it very difficult for a user to continue normal operation of the mobile device. In a preferred embodiment, it is possible to use both a software application and an external hardware device. The software application would be similar in communication and functionality as the other applications described herein. However, the primary difference is that at least part of the mobile device restriction would require the external hardware device sending the equivalent of key presses over a protocol, such as HID. The software application on the mobile device would alert the external hardware device of improper usage, which would then trigger the sending of the key presses. In this example, this type of application could likely be approved since it would not directly violate the manufacturer's application terms of service. In particular, such application does not restrict usage of other applications. Instead, it simply informs an external hardware component of the current state of the mobile device. The external component then issues whatever commands are appropriate, based on state of the mobile device, vehicle state, and policy.

(3) Alternative Triggers for Initiating Distracted Driving and Other Applications It is sometimes useful to trigger a mobile device to go into "blocking" mode using a signal from the carrier network or from a cloud-based data network that is sent down to the mobile device. In network-based call blocking, a vehicle is equipped with a unit that is able to both determine vehicle status and communicate that information to a cloud-based network or server. The mobile device associated with that vehicle will then receive this information from the network and begin blocking/auditing/scoring. One problem with this particular technique is that the user's mobile device will be blocked, even if the user and his mobile device are not in the vehicle but if that vehicle is being driven by someone else. Most systems utilizing a signal from the cloud to trigger blocking work on a one-to-one basis. Meaning, one mobile device is tied to one vehicle. This is not an ideal situation. Below are some solutions to this problem.

One solution is to use the control device described herein, in conjunction with one or more mobile devices within the vehicle, to determine location of such mobile devices and then to determine the likely driver of the vehicle based upon such location determinations. Armed with this information, it is then possible for the control device or a software application on the mobile device of the driver to communicate vehicle status information and driver information to the carrier network, which can then intelligently send back a suitable signal to cause the mobile device to go into blocking/auditing/scoring mode. Alternatively, the carrier itself could impose a block, at least on cellular voice and data communications controlled by the carrier, to prevent such functionality until the control device or mobile device sends a suitable signal indicating that the vehicle is no longer being driven by the user of the mobile device and/or that the mobile device is no longer located in the driver space of the vehicle. It will also be appreciated by those of skill in the art that, armed with the information concerning who is driving the vehicle, it is then possible for the control device or a software application on the mobile device of the driver to communicate vehicle status information and driver information to a remote application server, which can then intelligently send back driver-specific data and information that can be used by software applications installed on the mobile device, for purposes other than distracted driving prevention.

Another solution is to use the GPS of the mobile device to determine if the mobile device is in motion. This would be performed only upon notification from the cloud that the vehicle associated with that mobile device is in motion, so as to preserve battery life on the mobile device. Further, the GPS position of the mobile device can be compared to that of the vehicle. This would allow the user to continue to have use of his mobile device when riding with someone else in another vehicle—even if his vehicle is being used by another at the same time.

Yet another solution is to use the accelerometer of the mobile device to determine if there has been a period of "walking" before getting a signal from the cloud that the vehicle is in motion. This would identify a scenario in which the user was likely walking to his vehicle. Further, it would allow someone in a stationary position to continue using his mobile device while someone else was driving his vehicle. Any "walking" detected long before, or after the signal from the cloud indicating vehicle movement, could be ignored.

In another case, significant changes in temperature can be used to indicate that the user is moving toward her vehicle. For example, the user may be getting into her vehicle and turning on the heat or air conditioner. Alternately, the user may be walking from inside to outside to get in her vehicle. In either case, the rapid change in temperature will give some indication of a change in environment that, when correlated with the vehicle moving signal from the cloud, gives a higher level of certainty that the user is indeed driving her vehicle. This temperature can be correlated with the outside temperature of that location at that time, determined using the GPS coordinates from the vehicle and a third-party weather API, giving even better results.

Additionally, changes in barometric pressure can be used in a similar manner as temperature. Due to the nature of HVAC systems, barometric pressure is often different inside of buildings and vehicles than it is in the open environment. Some modern mobile device have barometric pressure sensors capable of detecting these differences. Again, this reading could be correlated with third-party data for increased accuracy.

Software running on the mobile device can analyze sounds captured within the vehicle, such as distinct engine noises, that could be used to determine the mobile device receiving the signal is actually in a vehicle. The sounds could be compared independently of the system control device in the vehicle, or sound samples captured by both a control device in the vehicle as well as the mobile device itself could be compared. For example, algorithms can be used to determine that the sounds heard by a mobile device are consistent with sounds that would be heard while in a vehicle. More specifically, the captured sounds may be used to determine the type of vehicle in which the mobile device is located to further verify that the mobile device is located in the intended or expected vehicle. Furthermore, if a sample was taken by both the control device and by the mobile device, the sounds can be compared to see if they were taken from the same vehicle. To aid in comparison, the control device or mobile device may broadcast a high frequency tone to signify an identifiable sound that can be detected by the other device to confirm that both are within the same vehicle.

In another implementation, the mobile device or control device may be periodically broadcasting a tone at a specified frequency to help with identification—as outlined above for identifying in which quadrant the mobile device is located. Using any of the above-mentioned methods, the control device in the vehicle may play audio tones, which are then picked up by the mobile device. Once the sounds have been picked up by the mobile device, a decision can be made as to whether the mobile device should be "blocked." Furthermore, using the quadrant-identifying techniques described above, a mobile device triggered to go into blocking mode from the network could be configured not to go into blocking mode, notwithstanding the network signal, if the mobile device determined that it was not within the driver quadrant of the vehicle.

If the mobile device is connected to a Bluetooth device, such as a vehicle navigation system or a hands-free phone application, such information could be valuable in determining if the mobile device is currently located within the "correct" or expected vehicle when the network "blocking" signal is generated.

As WiFi and connected-vehicle initiatives become increasingly more popular, using WiFi to identify that a particular mobile device is in a particular vehicle is becoming more viable. For example, merely determining with which WiFi network a mobile device is connected may be sufficient to confirm that such mobile device is in a particular vehicle. Another implementation may be to send data over the WiFi network in a challenge/response configuration. Another use of WiFi could be in an aftermarket hardware device added to a vehicle or integrated as part of the vehicle by the OEM that is running a web service which can be queried locally by a mobile device connected to the WiFi to determine state of the vehicle or to determine within which vehicle a mobile device is located.

Another detection mechanism is to use cellular signal characteristics, as detected by a hardware device located within the vehicle. Activity occurring on the mobile device, such as received or sent SMS messages, phone calls, or data transfers, can be used to narrow down which mobile device may be located in that particular vehicle. Absent any noticeable activity by the mobile device, the cellular signal detection hardware may be able to distinguish certain identifiable traits of the mobile device. Such as connected cell tower, relative cellular signal strength, cellular technology in use for example GSM vs. CDMA, 2G vs. 3G vs. LTE. Even characteristics produced by sensors running on the mobile device, such as Bluetooth, can be utilized.

It should be noted that all of the above methods could utilize and process the collected data within the mobile device, within the system control device, remotely from the vehicle, using a cloud-based server or processor, or any suitable combination of the above.

In another implementation, simply having the presence of various audio frequencies could be enough to trigger the application on the mobile device. One example could be to go into blocking/auditing/scoring mode whenever a consistent 19200 Hz and 19300 Hz signal is detected, as outlined in the various audio signal transmission methods discussed previously. If both signals are identified and consistently being played, the mobile device may use this as a signal to engage. To help prevent false positives related to the presence of the two signals, a third frequency may be used as a control or "presence" frequency. In one implementation, the left speaker might play a 19200 Hz tone and a 19300 Hz tone, whereas the right speaker would play a 19400 Hz tone and a 19300 Hz tone. In this example, the 19300 hz signal is the control signal. Further determination related to quadrant may be used as outlined above. It should be further stressed that all frequencies presented herein are intended only as examples. Any number of frequencies could be utilized in the presented solutions.

Another embodiment not requiring any hardware to be installed within the vehicle relies upon audio captured by the mobile device. Once the audio has been analyzed and determined to be in a vehicle, the accelerometer or GPS of the mobile device could be used to trigger motion and instruct the software on the mobile device to go into blocking mode. Through further analysis, the specific vehicle or type of vehicle could be determined. This would allow for a GPS or accelerometer based system to remove false positives and ensure that the mobile device is blocked only in intended vehicles.

In one implementation it may be desirable periodically to record background audio. Once the audio indicates that the mobile device is potentially in a vehicle, based on engine noises, known frequencies being played through the vehicle speakers, or other predetermined sounds that are used to detect that a mobile device is in a vehicle, the system can transition to using GPS or accelerometer for motion to launch the blocking software on the mobile device. A GPS triggered or accelerometer triggered solution implemented in this fashion would have substantially reduced battery drain.

In another implementation, GPS or accelerometer data may be used to indicate movement. Once movement has been indicated, the mobile device can record background audio to determine if it is in a vehicle and/or specifically in which quadrant within the vehicle the mobile device is located. Using this information, a determination for blocking/auditing/scoring can be made by the software on the mobile device.

Light (either visible or not visible to the human eye) could be picked up by light sensors built into many mobile devices. Changes in light could be an indication of change in environment, which may precede a mobile device entering a vehicle. Light could also be unique to a vehicle and used as a way of distinguishing one vehicle from another. For example, lights emitted by various instruments and gadgets found within a vehicle, or light from outside the vehicle filtered by window tint may be used and calibrated to apply to a specific vehicle—with calibration being adjusted based on time of day and current weather conditions retrieved for the current location of the vehicle or the mobile device. The intensity, hue, and saturation of light(s) detected could all be useful in making this determination. Light itself could also be a triggering mechanism, with different lights being emitted into the cabin of a vehicle and detected by the mobile device. Data can be communicated through this method as well, using frequency modulation techniques. Using infrared may be especially advantageous in this context, as it would be invisible to humans, while most digital cameras are capable of seeing near-infrared light.

By utilizing all of the above triggering mechanisms, the blocking/auditing/scoring applications described herein can have multiple mobile devices associated with a single vehicle or with multiple vehicles.

All of the above methods of determining which mobile device (or the likelihood of a mobile device) being in a vehicle could also be used to conserve battery on the mobile device for various blocking/auditing/scoring applications. Some of these sensors use less energy than BT, for example. Thus, first determining that a mobile device is in a vehicle, using one or more the above information, such as audio, light, temperature, magnetometer, etc., may be useful before the mobile device initiates any Bluetooth discovery protocols, which would help conserve battery life on the mobile device.

In all references above to blocking or triggering, the solution should be understood to mean a blocking solution, auditing, scoring, UBI, or hours of service type application.

(4) Logging, Collection, and Auditing of Driver Activity and Vehicle Usage Applications Advantageously, the systems, methods, and devices described herein are also capable of monitoring usage of a vehicle to detect, log, and report on dangerous or abusive operator behavior, such as excessive speeding or excessive idling of the vehicle.

For example, a mobile application could record the number of phone calls made, the duration of phone calls, SMS sent and/or received, applications used, duration of application(s) used, screen dimming/un-dimming, screen locked or unlocked status, and other variables to reconstruct a picture of how the mobile device was utilized while the user was driving.

In another example, the microphone of the control device can be used to detect breaking glass associated with the vehicle. Such detection in combination with vehicle movement, based on data from the accelerometer or the GPS module, could be used to indicate that the vehicle has been in an accident. In contrast, detection of breaking glass in combination with non-movement of the vehicle, again based on data from the accelerometer or the GPS module, could be used to indicate that the vehicle has been broken into. Applications running on a mobile device or running on the vehicle itself could then use this data to, in the first case, send an automated call to 911 and to a spouse or closest relative indicating that an accident has occurred. In the second case, applications running on a mobile device or running on the vehicle itself could then use this data to call 911 and call or text the owner of the vehicle indicating that a break-in may have occurred. The GPS location of the device could also be provided in such communication.

In another example, being able to detect noise in the cabin of the vehicle, such as a dog barking or a child crying, in combination with data detecting that the vehicle is not in motion and has not been in motion for a predetermined period of time, in combination with a high in-cabin temperature reading, could trigger an application to notify send an emergency alert call or text to the owner of the vehicle (or to authorities) depending upon the settings made in the application.

In a further example, the accelerometer of the control device can be used to detect rapid changes in orientation of the control device. If such rapid change in orientation is detected while the vehicle is in motion, such information could indicate that the vehicle has been involved in a potentially serious accident, indicating that the vehicle has rolled or flipped. On the other hand, such rapid change in orientation of the control device while the vehicle is not in motion could indicate that the user is attempting to remove the control device from its mounted position. Additional vehicular data detectable by the control device can further aid in validating if either of these conditions is actually occurring.

(5) UBI Scoring and Insurance Applications

Another advantage of knowing which mobile device is in the driver quadrant of a vehicle is to identify the owner of the mobile device as the likely driver of the vehicle, which can then be used for UBI scoring, rewards programs, electronic driver logging, and the like.

For purposes of UBI scoring, there can be individual scores for various factors associated with the driver. These factors can then be combined into a single cumulative score. Further, impaired driving can potentially be detected by swerving, hard braking, and hard acceleration. Each of these can be detected via accelerometer associated with the vehicle, with the control device installed in a vehicle, or with the mobile device, or any combination of the above.

For example, a mobile application could record the number of phone calls made, the duration of phone calls, SMS sent and/or received, applications used, duration of application(s) used, screen dimming/un-dimming, screen locked or unlocked status, and other variables to reconstruct a picture of how the mobile device was utilized while the user was driving. This usage information can then be formulated into a score to aid in UBI scoring, reward programs, or behavioral modification programs.

Utilizing a device capable of detecting signals emitting from the driver quadrant of a vehicle, UBI, rewards, or behavioral scoring could also be performed without needing an application to run on the mobile device. Such as outlined above, the signal detection system could record various uses of the mobile device while located within the driver quadrant.

Driving conditions can also play a role in such scoring. For example, if someone is driving into the sun, while it is at a low angle, this in a dangerous condition. This can be detected by heading information, latitude and longitude data (all gathered via GPS) combined with ephemeris data for the sun, at that time, and in that location. A threshold for both heading versus sun azimuth, as well as minimum and maximum sun altitude, could be used for this score, as well as length of time and speed while in this condition.

Driver fatigue can also be a contributing factor to accidents. This can be measured by tracking how many hours the driver has driven that day, as well as how many hours in a row the driver has driven. Additionally, late night interstate driving is more dangerous than late night city driving. Interstate driving can be detected by a continuous high speed or by collection of GPS data.

Additionally, the control device can be used to help detect, identify, and manage insurance fraud and collision management by monitoring/collecting data, such as accelerometer activity, g-force/impact, combined with GPS location and other data elements including driver/passenger identification. For instance, if an impact event happens, while a teenage-driver was driving the vehicle near the parent-vehicle-owner's home, the collected data would prevent the parent-vehicle-owner from moving the vehicle and staging a fraudulent accident at a later time, at a different location, and with a different driver.

(6) Smart Pairing Applications

Another use for driver identification (or identifying within which quadrant of the vehicle a mobile device is located) includes "smart pairing." For example, it is becoming more and more common for vehicles to adapt to the person who is driving. Many aspects of the driving experience (such as which mobile device is currently connected to hands free, which address book is shared, which music is being streamed, seat adjustments, etc.) can be configured within the vehicle based on driver. Using technology to identify which mobile device is within the driver quadrant can be used to make these technologies more efficient. For example, an application running on a mobile device can be configured to notify the head unit or head rest when the mobile device is in the driver quadrant. This would allow the vehicle's adjustments to take place automatically.

A common use case would be determining which mobile device is currently connected via Bluetooth to the head unit. If two family members enter into a vehicle today, only one of those mobile devices will connect to the head unit for music streaming, address book synching, and hands free calling. Typically, the mobile device that has been designated as the "primary" device associated with the vehicle will prevail—even if such device is not being carried by the driver. Using the control device disclosed herein and using one or more methods for determining whether the mobile device is located in the driver quadrant, the head unit could drop the connection to the "primary" mobile device when it has been determined that the primary mobile device is not located within the driver quadrant. This would free up the connection for the mobile device (and the customized vehicle settings) of the user who is actually sitting in the driver quadrant. Head unit technology can take advantage of this smart association without blindly relying upon which mobile device has been identified as the "primary" device associated with the vehicle and, instead, the system would dynamically designate whichever mobile device is in the driver quadrant as the currently active or primary device and associate the vehicle settings to the user associated with the detected mobile device.

The various technologies and techniques for determining whether the mobile device is located in the driver quadrant can also be used outside of today's current head unit use cases. For example, SMS could be withheld by the head unit automatically, calls could be routed to voice mail, auto responding messages could be sent. Any number of adjustments can be made to communications that are allowed—based on the mobile device located within the driver quadrant. Even behavioral modification technologies could benefit, being able to direct instructions tailored towards the actual driver or passengers based on the various locations of the mobile devices within the cabin of the vehicle.

(7) Industry Specific Applications

Another use for driver identification (or identifying within which quadrant of the vehicle a mobile device is located) includes the ability to communicate with third party route management software as to GPS location, start/stop time, etc. Such data can also be cross-referenced for route optimization, re-routing due to traffic congestion data, validation and/or verification of home healthcare visits, compliance with house arrest or parole obligations, delivery notifications and confirmations, and the like.

In view of the foregoing detailed description of preferred embodiments of the present invention, it readily will be understood by those persons skilled in the art that the present invention is susceptible to broad utility and application. While various aspects have been described herein, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

We claim:

1. A monitoring device for collecting and transmitting operational data about a vehicle to a separate communication device located within the vehicle, the monitoring device comprising:
    a housing mounted to the vehicle; and
    a power supply contained within the housing and adapted to provide power to electronic components contained within the housing, the electronic components including:
        a microprocessor;
        memory in electronic communication with the microprocessor and configured to store the operational data;
        one or more sensors for detecting and determining operational data associated with the vehicle, wherein the microprocessor causes the operational data to be stored in the memory; and
        a data transmission module, controlled by the microprocessor and configured to retrieve the operational data from the memory and periodically to transmit the retrieved operational data to the separate communication device using Bluetooth protocols,
wherein the separate communication device is configured to receive the retrieved operational data, to further process and store the retrieved operational data, and subsequently to upload the processed operational data to a remote server located outside the vehicle.

2. The monitoring device of claim 1, wherein the housing is mounted within the vehicle in proximity to a central axis of the vehicle, the central axis extending generally between a driver space and a front passenger space within the vehicle.

3. The monitoring device of claim 2, wherein the housing is mounted on the inside surface of the front windshield of the vehicle.

4. The monitoring device of claim 2, wherein the housing is permanently built into the vehicle by a manufacturer of the vehicle or by an after-market vendor.

5. The monitoring device of claim 1, wherein the power supply includes one or more of: a solar panel, a battery installed in the monitoring device, and a connection to a battery installed in the vehicle.

6. The monitoring device of claim 5, wherein the connection to the battery installed in the vehicle is made through one or more of: a lighter socket of the vehicle, a plug connector on the housing of the monitoring device, and a USB port on the housing of the monitoring device.

7. The monitoring device of claim 1, wherein the one or more sensors include one or more of: an accelerometer for detecting movement of the vehicle, a GPS module for detecting geographic location and speed of the vehicle, a temperature sensor for detecting temperature inside the vehicle, and a microphone for detecting ambient sound inside the vehicle.

8. The monitoring device of claim 1, wherein the data transmission module transmits the retrieved operational data about the vehicle using classic Bluetooth protocols.

9. The monitoring device of claim 1, wherein the data transmission module makes a Bluetooth pairing with the separate communication device.

10. The monitoring device of claim 1, wherein the data transmission module broadcasts the retrieved operational data about the vehicle without making a Bluetooth pairing with the separate communication device.

11. The monitoring device of claim 10, wherein the retrieved operational data about the vehicle is broadcast in at least one field of the Bluetooth device name of the data transmission module.

12. The monitoring device of claim 10, wherein the retrieved operational data about the vehicle is broadcast in a plurality of Bluetooth device names associated with the data transmission module, wherein each of the plurality of Bluetooth device names includes at least one field containing the retrieved operational data.

13. The monitoring device of claim 1, wherein the data transmission module transmits the retrieved operational data about the vehicle using Bluetooth low energy (BTLE) protocols.

14. The monitoring device of claim 1, wherein the separate communication device includes one or more mobile devices located within the vehicle.

15. The monitoring device of claim 1, wherein the separate communication device includes one or more computer systems associated with the vehicle but physically independent from the monitoring device.

16. The monitoring device of claim 1, wherein the one or more sensors include an accelerometer for detecting movement of the vehicle and wherein the monitoring device remains in a low power or sleep state until the accelerometer detects movement of the vehicle.

17. The monitoring device of claim 16, wherein the monitoring device returns to a low power or sleep state if the accelerometer does not detect movement of the vehicle for a predetermined period of time.

18. The monitoring device of claim 1, wherein the retrieved operational data is deleted from the memory after being transmitted by the data transmission module.

19. The monitoring device of claim 1, wherein the retrieved operational data remains stored in the memory after being transmitted by the data transmission module if space remains available in the memory.

* * * * *